(12) United States Patent
Ramesh Babu et al.

(10) Patent No.: US 11,893,677 B1
(45) Date of Patent: Feb. 6, 2024

(54) BOUNDING VOLUME HIERARCHY (BVH) WIDENING BASED ON NODE COMPRESSIBILITY

(71) Applicant: QUALCOMM Incorporated, San Diego, CA (US)

(72) Inventors: Adimulam Ramesh Babu, San Diego, CA (US); Srihari Babu Alla, San Diego, CA (US); Avinash Seetharamaiah, San Diego, CA (US); Jonnala Gadda Nagendra Kumar, San Diego, CA (US); David Kirk McAllister, Holladay, UT (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/816,375

(22) Filed: Jul. 29, 2022

(51) Int. Cl.
| | |
|---|---|
| G06T 15/06 | (2011.01) |
| G06T 17/10 | (2006.01) |
| G06T 17/00 | (2006.01) |
| G06T 15/08 | (2011.01) |

(52) U.S. Cl.
CPC .............. *G06T 15/06* (2013.01); *G06T 15/08* (2013.01); *G06T 17/005* (2013.01); *G06T 17/10* (2013.01)

(58) Field of Classification Search
None
See application file for complete search history.

(56) References Cited

U.S. PATENT DOCUMENTS

| | | | | |
|---|---|---|---|---|
| 10,235,338 | B2* | 3/2019 | Laine | H04N 19/174 |
| 2017/0236335 | A1* | 8/2017 | Endresen | G06T 17/10 |
| | | | | 345/420 |
| 2022/0392147 | A1* | 12/2022 | Bruce | G06T 15/06 |
| 2023/0298254 | A1* | 9/2023 | Benthin | G06T 15/06 |
| | | | | 345/418 |
| 2023/0298255 | A1* | 9/2023 | Benthin | G06T 15/06 |
| | | | | 345/426 |

OTHER PUBLICATIONS

Afra A.T., "Interactive Ray Tracing of Large Models Using Voxel Hierarchies", Computer Graphics Forum, Journal of the European Association for Computer Graphics, Wiley-blackwell, Oxford, vol. 31, No. 1, Jan. 26, 2012, pp. 75-88, XP071488193.

(Continued)

*Primary Examiner* — Nurun Flora
(74) *Attorney, Agent, or Firm* — Polsinelli

(57) ABSTRACT

Systems and techniques are provided for widening a hierarchical structure for ray tracing. For instance, a process can include obtaining a plurality of primitives of a scene object included in a first hierarchical acceleration data structure and determining one or more candidate hierarchical acceleration data structures each including the plurality of primitives. A cost metric can be determined for the one or more candidate hierarchical acceleration data structures and, based on the cost metric, a compressibility prediction associated with a candidate hierarchical acceleration data structure of the one or more candidate hierarchical acceleration data structures can be determined. An output hierarchical acceleration data structure can be generated based on the compressibility prediction.

30 Claims, 13 Drawing Sheets

(56) References Cited

OTHER PUBLICATIONS

Benthin C., et al., "Compressed-Leaf Bounding Volume Hierarchies (Originally Submitted, Un-shortened Version)", Jul. 1, 2018, pp. 1-6, XP055679686, abstract, p. 3, paragraph 4.2, p. 4, paragraph 4.5.
Garanzha K., et al., "Grid-based SAH BVH construction on a GPU", The Visual Computer, International Journal of Computer Graphics, Springer, Berlin, DE, May 5, 2011, vol. 27, No. 6-8, pp. 697-706, XP019905206.
International Search Report and Written Opinion—PCT/US2023/069985—ISA/EPO—dated Sep. 28, 2023.
Meister D., et al., "Parallel Reinsertion for Bounding Volume Hierarchy Optimization", Computer Graphics Forum, Journal of the European Association for Computer Graphics, Wiley-blackwell, OXFORD, May 22, 2018, vol. 37, No. 2, pp. 463-473, XP071546178.

\* cited by examiner

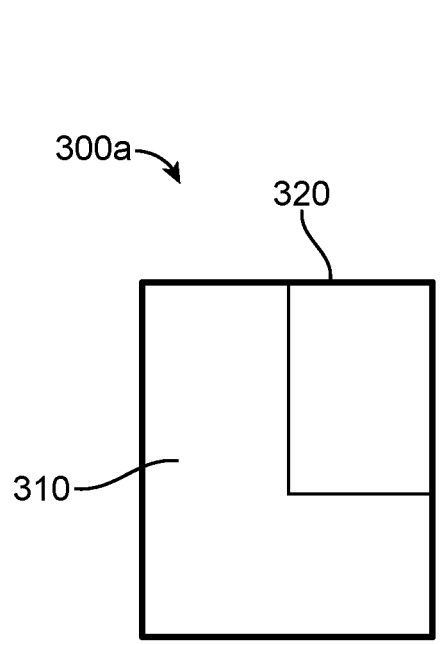 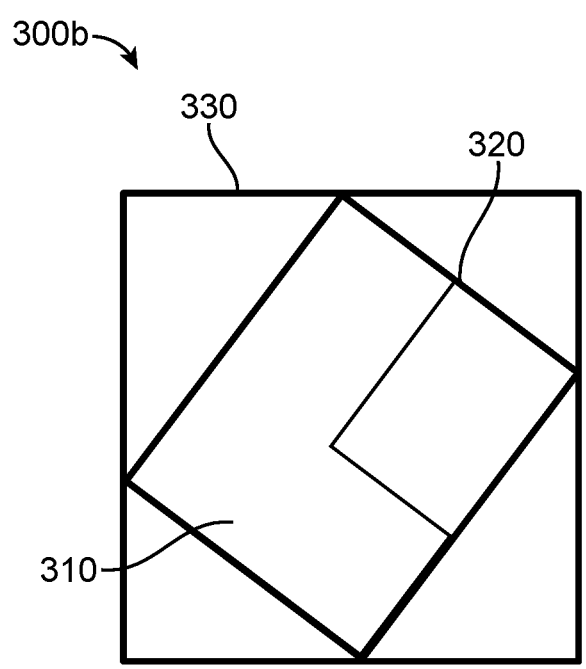
FIG. 3A  FIG. 3B

BOUNDING VOLUME HIERARCHY (BVH) WIDENING BASED ON NODE COMPRESSIBILITY

FIELD

The present disclosure generally relates to graphics processing. For example, aspects of the present disclosure are related to systems and techniques for determining shadow rays using a hierarchical structure for ray tracing.

BACKGROUND

Ray tracing is a computer graphics technique that can be used to generate images by tracing paths of light through a three-dimensional scene, simulating interactions with objects illuminated by light sources, and determining ray intersections. Ray intersections can include ray-primitive intersections or ray-object intersections. Primitives are geometric shapes that can be used to construct or model larger three-dimensional objects. For example, primitives can include triangles or polygons.

Ray tracing can be used to generate realistic images, including shadows, of a three-dimensional scene. Scene geometry can be stored in an acceleration data structure that groups scene primitives. An acceleration data structure can be used to accelerate the process of ray tracing by improving the efficiency of ray intersection tests and/or calculations. For example, a bounding volume hierarchy (BVH) is an acceleration data structure that can group scene primitives in a hierarchical tree of bounding volumes enclosing one or more of the scene primitives. Ray tracing can be performed by traversing these hierarchies to determine ray-primitive and/or ray-object intersections.

BRIEF SUMMARY

In some examples, systems and techniques are described for performing Bounding Volume Hierarchy (BVH) widening based on a compressibility determination or prediction for one or more candidate BVH nodes. For example, a compressibility determination or prediction can be determined for one or more BVH leaf nodes of a candidate widened BVH. According to at least one illustrative example, a method is provided for ray tracing, the method including: obtaining a plurality of primitives of a scene object included in a first hierarchical acceleration data structure; determining one or more candidate hierarchical acceleration data structures, each candidate hierarchical acceleration data structure of the one or more candidate hierarchical acceleration data structures including the plurality of primitives; determining a cost metric for the one or more candidate hierarchical acceleration data structures; determining, based on the cost metric, a compressibility prediction associated with a candidate hierarchical acceleration data structure of the one or more candidate hierarchical acceleration data structures; and generating an output hierarchical acceleration data structure based on the compressibility prediction.

In another example, an apparatus for ray tracing is provided that includes a memory (e.g., configured to store data, such as graphics data, one or more images, etc.) and one or more processors (e.g., implemented in circuitry) coupled to the memory. The one or more processors are configured to and can: obtain a plurality of primitives of a scene object included in a first hierarchical acceleration data structure; determine one or more candidate hierarchical acceleration data structures, each candidate hierarchical acceleration data structure of the one or more candidate hierarchical acceleration data structures including the plurality of primitives; determine a cost metric for the one or more candidate hierarchical acceleration data structures; determine, based on the cost metric, a compressibility prediction associated with a candidate hierarchical acceleration data structure of the one or more candidate hierarchical acceleration data structures; and generate an output hierarchical acceleration data structure based on the compressibility prediction.

In another example, a non-transitory computer-readable medium is provided that has stored thereon instructions that, when executed by one or more processors, cause the one or more processors to: obtain a plurality of primitives of a scene object included in a first hierarchical acceleration data structure; determine one or more candidate hierarchical acceleration data structures, each candidate hierarchical acceleration data structure of the one or more candidate hierarchical acceleration data structures including the plurality of primitives; determine a cost metric for the one or more candidate hierarchical acceleration data structures; determine, based on the cost metric, a compressibility prediction associated with a candidate hierarchical acceleration data structure of the one or more candidate hierarchical acceleration data structures; and generate an output hierarchical acceleration data structure based on the compressibility prediction.

In another example, an apparatus for ray tracing is provided. The apparatus includes: means for obtaining a plurality of primitives of a scene object included in a first hierarchical acceleration data structure; means for determining one or more candidate hierarchical acceleration data structures, each candidate hierarchical acceleration data structure of the one or more candidate hierarchical acceleration data structures including the plurality of primitives; means for determining a cost metric for the one or more candidate hierarchical acceleration data structures; means for determining, based on the cost metric, a compressibility prediction associated with a candidate hierarchical acceleration data structure of the one or more candidate hierarchical acceleration data structures; and means for generating an output hierarchical acceleration data structure based on the compressibility prediction.

In some aspects, one or more of the apparatuses described above is or is part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 3A illustrates an example of a scene object and an object-space bounding volume enclosing the scene object, in accordance with some examples;

FIG. 3B illustrates an example of a world-space bounding volume enclosing the object-space bounding volume and scene object of FIG. 3A, in accordance with some examples;

DETAILED DESCRIPTION

Figure 1A:
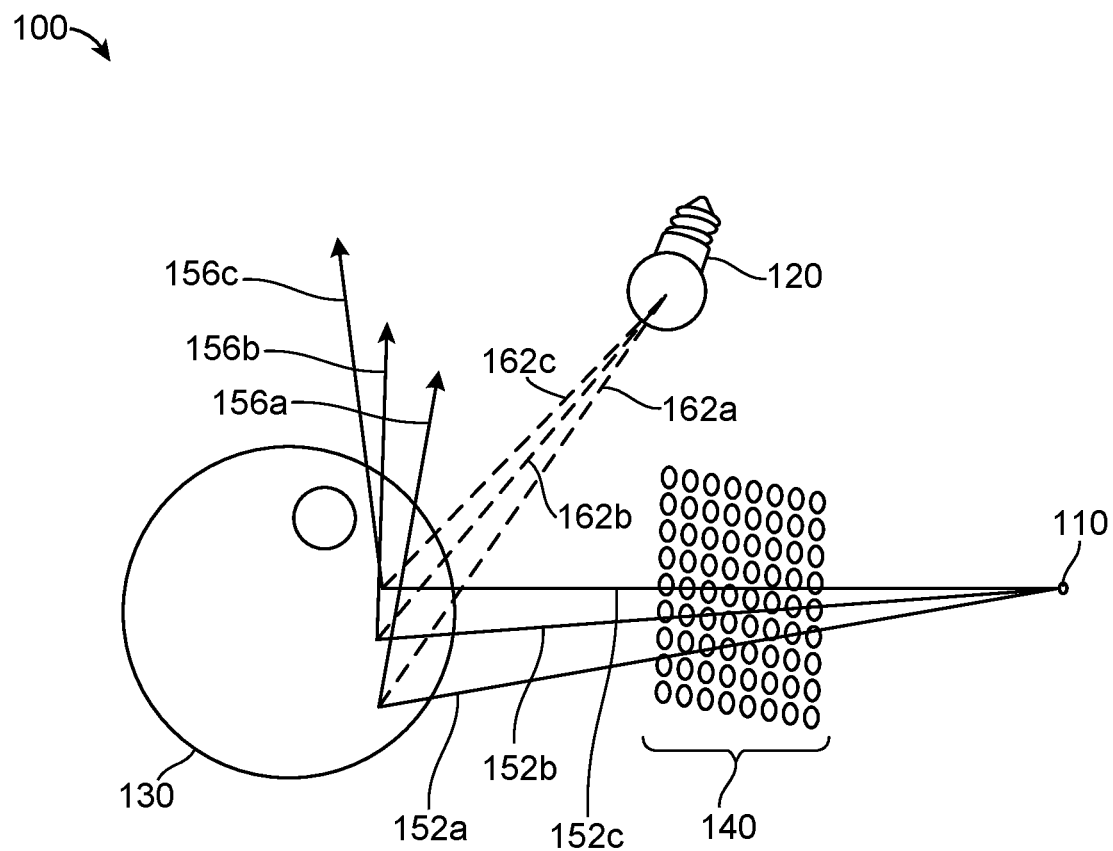
FIG. 1A illustrates an example of a ray tracing process, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Ray tracing is a graphics processing and rendering technique that can be used to produce photorealistic images by modeling light transport to simulate optical effects. Ray tracing can realistically simulate the lighting of a three-dimensional (3D) scene and its objects by rendering physically correct reflections, refractions, shadows, and/or indirect lighting in the two-dimensional (2D) view of the scene.

Ray tracing can be a computationally intensive technique. For example, the computational resources (e.g., compute time) used to ray trace a single frame can increase with the number of rays that are traced per frame and/or can increase with the computational resources (e.g., compute time) expended to trace each individual ray. Due to this computational complexity, ray tracing may often be limited to non-real time uses. Real-time ray tracing has long been sought after for uses such as rendering video games, virtual reality (VR) and augmented reality (AR) experiences, etc. Real-time ray tracing has recently become possible, using, for example, hardware acceleration units and/or graphics processing units (GPUs) that can provide parallelization of the underlying calculations for each individual ray that is projected into a scene.

The number of rays that can be projected into a scene for each frame is often relatively small, as the rendering time per frame cannot exceed some maximum amount without losing real-time performance. The image quality when using real-time ray tracing can be improved by increasing the number of rays projected into the scene per frame. For example, the number of rays projected into the scene per frame can be increased by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance (e.g., image quality) of existing ray tracing hardware is desirable.

Systems, apparatuses, processes (also referred to as methods), and computer readable media (collectively referred to as "systems and techniques") are described herein that can provide accelerated ray tracing operations based on one or more acceleration data structures. For example, as described in more detail herein, the systems and techniques can be used to generate one or more bounding volume hierarchies (BVHs) based on widening a binary BVH and/or performing leaf node compression. In some examples, the systems and techniques can perform compression aware BVH widening using one or more leaf node compressibility factors or predictions. For example, the systems and techniques can determine or predict a compressibility of one or more BVH leaf nodes, and the predicted compressibility information can be used to perform BVH widening without generating one or more wide BVH nodes that are uncompressible (e.g., cannot be compressed within a pre-determined or fixed number of bytes). In one illustrative example, BVH widening can be performed based on predicting whether a candidate wide BVH leaf node can be compressed within 64 bytes. If the candidate wide BVH leaf node is compressible using 64 bytes, then the BVH widening can include the candidate wide BVH leaf node. If the candidate wide BVH leaf node is not compressible using 64 bytes, then the BVH widening can exclude the candidate wide BVH leaf node from consideration.

Various aspects of the application will be described with respect to the figures.

FIG. 1A is a diagram illustrating an example of a ray tracing technique 100. As illustrated, a ray tracing system can perform ray tracing by casting a plurality of rays (e.g., ray 152a, ray 152b, and ray 152c) from a virtual or imaginary view camera 110 (e.g., which determines the view into the 3D scene), through the pixels 140 of a 2D viewing plane, out into the 3D scene. In some examples, the rays 152a-c may also be referred to as "primary rays." Each primary ray can pass through a particular one of the pixels 140 (e.g., as illustrated in FIG. 1A). In some cases, each primary ray can pass through a different one of the pixels 140 when rendering a 3D scene. Multiple rays may also be used for some (or all) of the pixels 140. After casting one or more of the primary rays 152a-c, a ray tracing system can then trace the path of each primary ray to determine if the ray reaches back to a light source 120 in the 3D scene. Multiple different primary rays can be processed in parallel (e.g., because primary rays interact with various objects, surfaces, light sources, etc., in the 3D scene, but do not interact with other primary rays).

In the example of ray tracing technique 100, each primary ray 152a-c originates from the virtual or imaginary view camera 110 (e.g., sharing a common origin) and is projected through a particular pixel of the plurality of pixels 140 that are located on the 2D viewing plane (e.g., as described above). In the event a particular one of the primary rays 152a-c reaches a light source (e.g., light source 120) in the 3D scene, then information from that ray may be used to contribute to the final color and/or illumination level of the pixel (e.g., from the pixels 140) through which the particular ray was projected.

For example, when rays projected into the scene intersect with one or more objects (e.g., such as object 130), color and lighting information from the point(s) of intersection on the object(s) surfaces can contribute to the final colors and illumination levels of the pixels (e.g., pixels 140) associated with the rays (e.g., primary rays 152a-c). The color and lighting information can be determined based on whether the ray-object intersection point is directly illuminated by a light source (e.g., light source 120) or occluded (e.g., shadowed). Color and lighting information for a ray-object intersection point can be determined by projecting one or more shadow rays from the ray-object intersection point to the light sources within the scene, as will be described in greater depth below. If a shadow ray does not intersect an object on its way to the light source, then the ray-object intersection (e.g., also referred to as a "hit point") is illuminated. If the shadow ray does intersect with another object, then the hit point may be occluded (e.g., the object intersected by the shadow ray can cast a shadow on the hit point). Similarly, different objects can have different surface properties that reflect, refract, and/or absorb light in different ways, which can also contribute to the final pixel colors and/or illumination level. Rays can also reflect off of objects and hit other objects in the scene, or travel through the surfaces of transparent objects, etc., before reaching a light source (e.g., light source 120).

For example, as illustrated in FIG. 1A, a first primary ray 152a is projected into the scene and intersects object 130, resulting in the generation of a first shadow ray 162a. First shadow ray 162a is projected between the hit point (e.g., where first primary ray 152a intersects object 130) and light source 120, and may be used to determine whether the hit point between first primary ray 152a and object 130 is directly illuminated by light source 120 or shadowed by an additional scene object. As illustrated, first shadow ray 162a reaches light source 120 and consequently, can contribute color or illumination information for rendering the particular one of the pixels 140 through which first primary ray 152 was projected. The intersection (e.g., hit point) between first primary ray 152a and object 130 may also be used to generate one or more reflection rays, such as the first reflection ray 156a depicted in FIG. 1A. First reflection ray 156a does not reach light source 120, and consequently, may not directly contribute color or illumination information back to the pixels 140. In some cases, first reflection ray 156a may intersect with additional scene objects (not shown) and can contribute color and/or illumination information for these additional intersection points between the reflection ray and one or more additional scene objects. A same or similar scenario is illustrated for second primary ray 152b and the associated second shadow ray 162b (e.g., which reaches light source 120) and second reflection ray 156b (e.g., which does not reach light source 120), as well as for third primary ray 152c and the associated third shadow ray 162c (e.g., which reaches light source 120) and third reflection ray 156c (e.g., which does not reach light source 120).

Figure 1B:
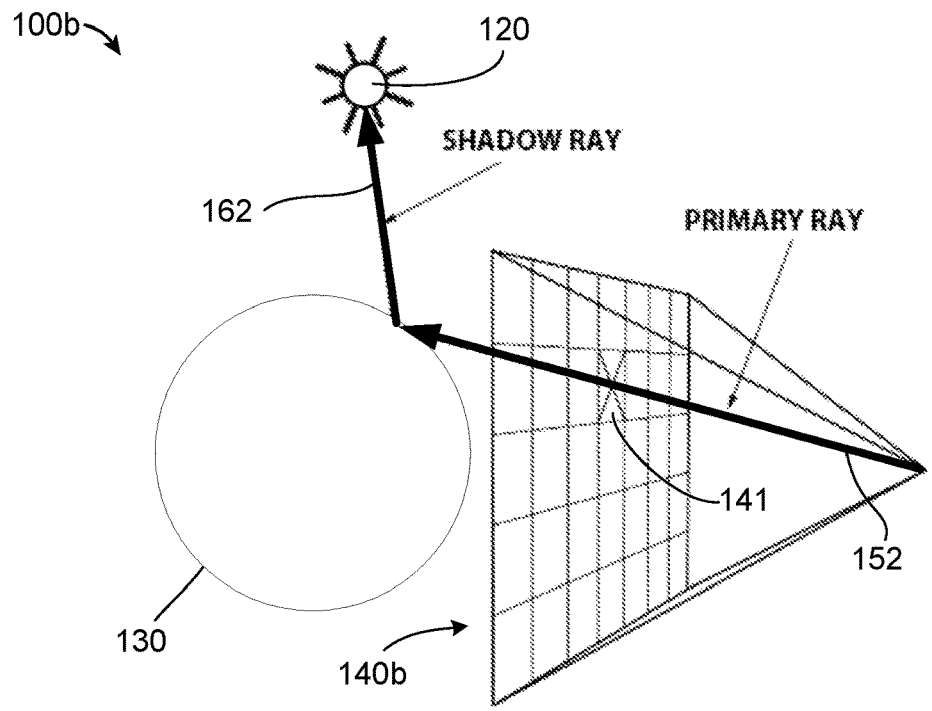
FIG. 1B illustrates an example of a ray tracing process including one or more shadow rays, in accordance with some examples.

FIG. 1B is a diagram illustrating another example of a ray tracing process 100b. Here, a primary ray 152 is projected through a grid of pixels 140b and into a scene that includes object 130. For example, primary ray 152 is projected from an origin/viewpoint, through a particular pixel 141 (e.g., included in the grid of pixels 140b), and intersects with object 130. The hit point or ray-object intersection between primary ray 152 and object 130 is then used as the origin for generating and projecting a shadow ray 162. As described above, shadow ray 162 can be projected from the hit point to the light source 120. As depicted in FIG. 1B, shadow ray 162 reaches light source 120 without intersecting any other object or scene primitive, and lighting and color information can be determined for pixel 141 based on the hit point being directly illuminated by light source 120.

Figure 1C:
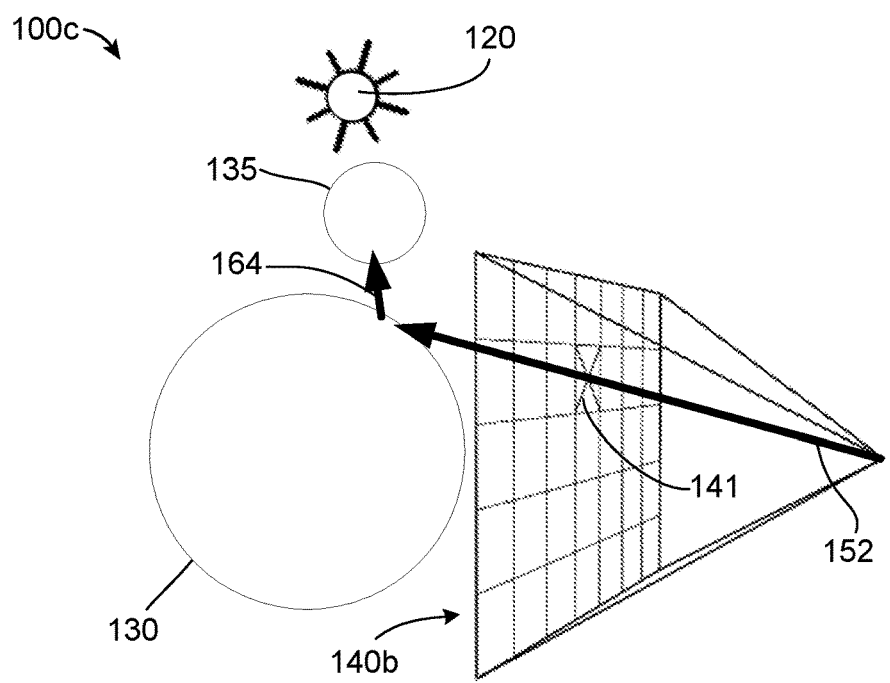
FIG. 1C illustrates an example of a ray tracing process including one or more occluded shadow rays, in accordance with some examples.

FIG. 1C is a diagram illustrating another example of a ray tracing process 100c. The diagram of FIG. 1C is the same as that of FIG. 1B, with the addition of an additional object 135 (e.g., an additional scene primitive) that lies along the direct path between the hit point (e.g., where primary ray 152 and object 130 intersect) and the light source 120. Here, when a shadow ray 164 is generated and projected from the hit point to the light source 120, shadow ray 164 intersects with additional object 135 and does not reach light source 120. Because shadow ray 164 does not reach light source 120, the hit point may be considered occluded or shadowed by the additional object 135. For example, based on the intersection between shadow ray 164 and additional object 135, lighting and color information can be determined for pixel 141 based on the hit point being occluded or shadowed (e.g., occluded or shadowed with respect to the light source 120). In some examples, after generating and projecting a shadow ray in response to determining a hit point between a primary ray and a scene object/primitive, processing for the shadow ray can be terminated when the shadow ray intersects with the light source or another scene primitive (e.g., whichever comes first).

As mentioned previously, each interaction between a ray and an object (e.g., scene object, primitive, surface within the 3D scene, etc.) can contribute color and/or illumination information back to the particular pixel through which a primary ray was projected. In some cases, tracing a greater number of interactions per ray can provide increased visual fidelity (e.g., quality) of the rendered scene at the expense of increased computational cost (e.g., time). For example, a ray tracing approach that prioritizes speed over quality might calculate or otherwise determine only the first reflection for each ray, while a ray tracing approach that prioritizes quality over speed might determine three or more reflections per ray. In some cases, after observing either a maximum number of reflections or a ray traveling a certain distance without intersection, the ray can cease to travel and the pixel's value can be updated. In some cases, the ray can cease to travel and the pixel's value can be updated based on a ray traveling a certain distance without reflection (e.g., reflection being one possible outcome of an intersection). In some cases, the number of rays that are projected through each pixel of the 2D viewing plane can be adjusted based on a similar tradeoff between computational cost and visual fidelity.

Ray tracing can therefore become very costly in terms of the time and/or computational power that is required to render realistic-looking scenes, based, for example, on the number of rays projected into the scene and the number of additional rays that are traced for secondary reflections and refractions. Due to this computational complexity, ray tracing is typically limited to non-real time uses (e.g., scenes or visual effects that could be rendered in advance for film and television). Real-time ray tracing has long been sought after for use cases such as rendering video games, virtual reality (VR) and augmented reality (AR) experiences, etc.

Real-time ray tracing has recently become possible and is often performed by hardware acceleration units and/or graphics processing units (GPUs) that can provide parallelization of the underlying calculations for each individual ray that is projected into the scene. The number of rays that can be projected into the scene for each frame is often relatively small, as the rendering time per frame cannot exceed some maximum amount without losing real-time performance.

The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance of existing ray tracing hardware is desirable. For example, the number of rays projected into the scene per frame can also be increased by tracing each ray more efficiently (e.g., reducing the compute time per ray trace operation allows more ray trace operations to be performed in the same fixed rendering time per frame).

One example of a ray tracing acceleration technique utilizes tree-based (e.g., hierarchical) acceleration structures to improve the efficiency of ray intersection tests (e.g., also referred to as "collision tests" and/or "hit tests") and/or other ray tracing operations. For example, a ray intersection test can include, but is not limited to, determining whether a primary ray intersects with one or more scene objects or primitives (e.g., after the primary ray is projected into the scene); determining whether a shadow ray intersects with an additional scene object or primitive (e.g., after the shadow ray is projected from a primary ray hit point to a light source); and determining whether a reflection ray intersects with an additional scene object or primitive (e.g., after the reflection ray is projected from a hit point, using a calculated reflection angle).

Figure 2A:
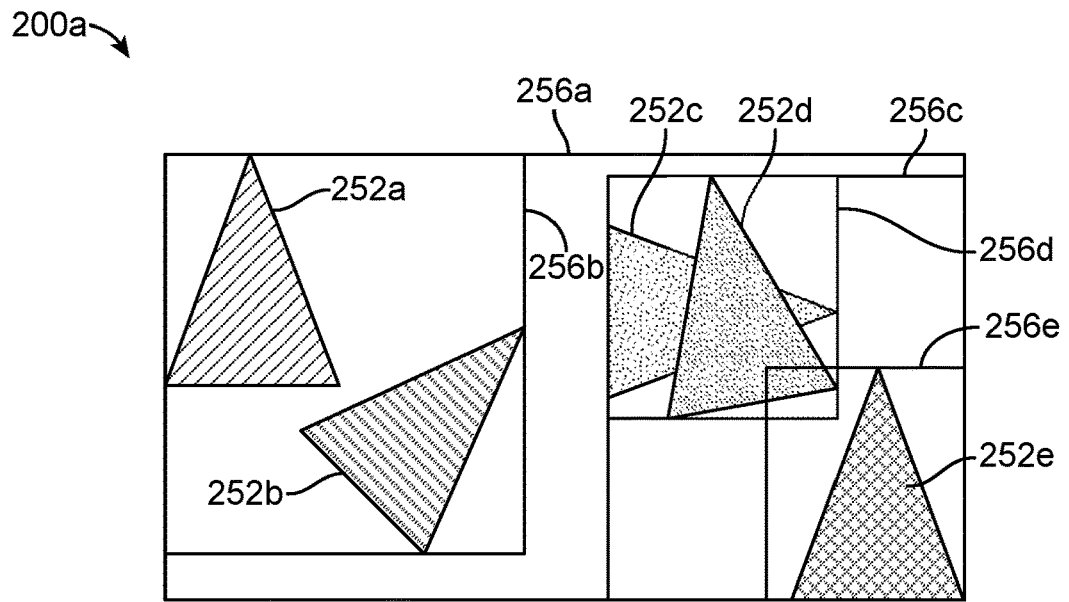
FIG. 2A illustrates an example of bounding volumes including one or more primitives representing portions of surfaces in a scene, in accordance with some examples.
Figure 2B:
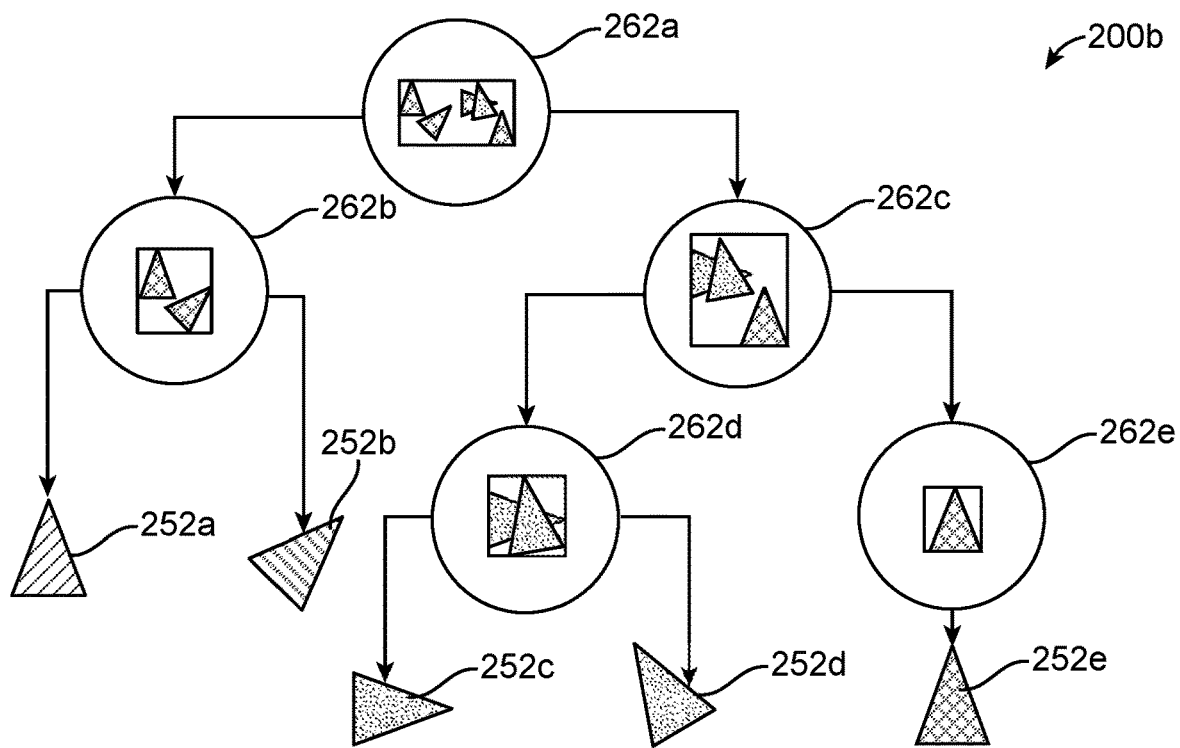
FIG. 2B illustrates an example of a bounding volume hierarchy (BVH) organizing the bounding volumes of FIG. 2A, in accordance with some examples.

Scenes can be converted into bounding volume hierarchies (BVHs), which are hierarchical tree structures (e.g., hierarchical acceleration data structures) composed of ever-tighter bounding volumes (also referred to as "bounding regions" such as bounding boxes or "axis-aligned bounding boxes" (AABBs)). For example, FIG. 2A illustrates an example in which a scene 200a containing a plurality of triangle primitives 252a-252e is arranged into a series of ever-tighter bounding boxes 256a-256e. Scenes may contain hundreds, thousands, or more primitives, but for purposes of clarity, only the five triangle primitives 252a-252e are depicted. The bounding boxes 256a-256e can be AABBs, which are bounding boxes having a minimized area or volume within which all points of the enclosed primitives (e.g., triangle primitives 252a-252e) may lie. The bounding boxes may be axis-aligned such that the edges of each bounding box 256a-256e are parallel to a coordinate axis (e.g., the x, y, and z axes). FIG. 2B illustrates an example hierarchical data structure 200b having nodes that are associated with the bounding boxes 256a-256e and triangle primitives 252a-252e shown in FIG. 2A. The hierarchical data structure 200b can be a BVH. For example, a BVH root node 262a can correspond to the bounding box 256a shown in FIG. 2A; similarly, an intermediate BVH node 262b can correspond to the bounding box 256b of FIG. 2A; intermediate BVH node 262c can correspond to the bounding box 256c of FIG. 2A, and so on.

A BVH root node (e.g., BVH root node 262a of FIG. 2B) contains an AABB (e.g., bounding box 256a of FIG. 2A) enclosing all the individual scene or object geometry contained in the BVH leaf nodes. Each primitive in the BVH root node is assigned to either the left or right child node. The child nodes contain the AABBs containing their assigned geometry, and this geometry is likewise assigned to left or right child nodes, recursively until the BVH leaf nodes contain a small number of primitives, e.g., four or fewer. Depending on the extent of any scene changes and/or object deformations, the next and any subsequent frames may require one or more new BVH build operations or BVH refitting/update operations based on the scene changes.

As mentioned previously, testing each ray for intersection against every primitive in the scene can be inefficient and computationally expensive. BVHs can be used to accelerate ray intersection testing techniques, among other ray tracing operations. For example, BVHs can be used for efficient traversal during the processing of collision checks associated with primary rays, shadow rays, reflection rays, etc. Each ray can be tested for intersection against BVH bounding boxes (e.g., using a depth-first tree traversal process) instead of being tested against every primitive in the scene. As mentioned previously, bounding boxes encompass or surround different amounts of scene geometry or primitives and become increasingly tighter with the depth of the BVH tree structure.

Bounding boxes (e.g., AABBs or other bounding boxes) or other bounding regions can be defined with respect to world-space or object-space. World-space can be considered a constant (e.g., the coordinate space of the overall 3D scene). Objects can exist in their own coordinate space, which is referred to as object-space (e.g., the coordinate space in which the object was modeled or created). For example, FIGS. 3A and 3B are diagrams depicting object-space and world-space AABBs (axis-aligned bounding boxes) for the same geometry. Here, FIG. 3A illustrates an object-space AABB 320 of a geometric scene object 310. Scene objects can include the 3D or graphical objects that are present in a 3D scene for which ray tracing is performed. In some cases, geometric scene objects can be scene objects that include geometric primitives such as triangles. In some examples, scene objects can include AABBs or other object representations. Object-space AABB 320 and scene object 310 are both shown in the object-space 300a of the scene object 310. FIG. 3B illustrates the same geometric scene object 310 but transformed into the world-space 300b of the scene (e.g., the scene to which scene object 310 belongs or is located). A world-space AABB 330 encloses both the object-space AABB 320 and the scene object 310.

Figure 4A:
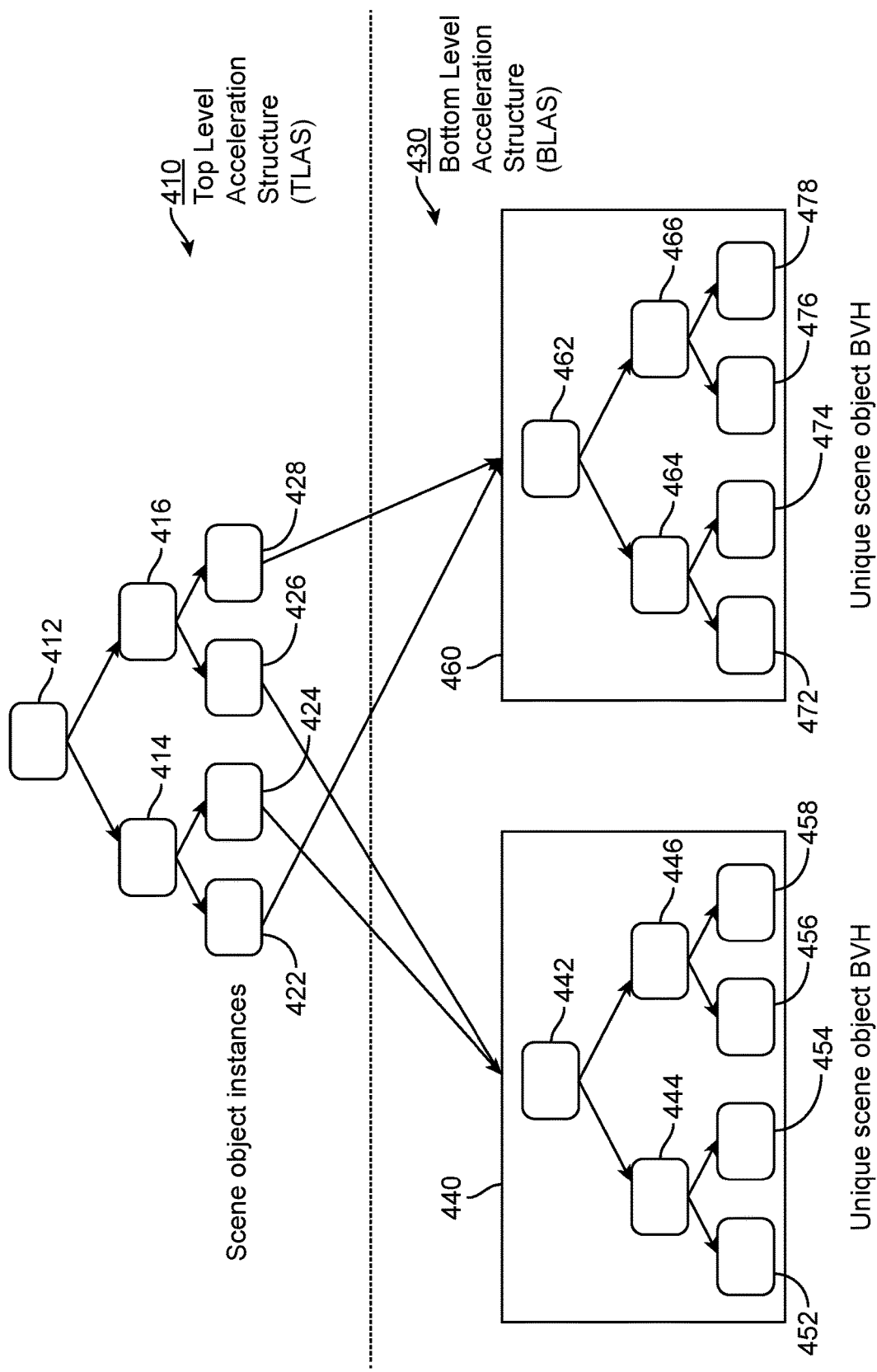
FIG. 4A illustrates an example of an acceleration data structure including a top-level acceleration structure (TLAS) and a bottom-level acceleration structure (BLAS), in accordance with some examples.

Ray tracing can utilize a two-level acceleration structure system, such as a top-level acceleration structure (TLAS) and a bottom-level acceleration structure (BLAS), as depicted in FIG. 4A. For example, FIG. 4A illustrates a TLAS 410 and a BLAS 430, which are described in greater depth below.

The TLAS 410 is built in world-space. TLAS primitives are instances of BLASs, which are defined in object-space. A TLAS can be constructed as a BVH with leaf nodes containing a BLAS. For example, the TLAS leaf nodes 422, 424, 426, and 428 each contain or are otherwise associated with one of the two BLASs 440 and 460. A translation matrix can be encoded in the TLAS leaf node to perform conversion from world-space to object-space and/or vice versa, as described in greater depth below.

A BLAS can be constructed for each object in a scene, referred to as a scene object. For example, FIG. 4A illustrates a BLAS 440 that may be constructed for a first unique scene object and a BLAS 460 that may be constructed for a second unique scene object. BLAS primitives can be the triangles or the AABBs of procedural primitives used to build the scene object. A bottom level BVH is built over the set of these triangles or AABBs of the scene object, with each BLAS leaf node containing a small number (e.g., up to four, five, or some other number) of triangles or AABBs. For example, in the context of FIG. 4A, the BLAS leaf nodes 452-458 and 472-478 can each contain some quantity of triangles, AABBs, or other primitives used to build the scene object. In some examples, a BLAS can also be referred to as a "bottom level BVH." Multiple instances of the same BLAS can be included in a TLAS. For example, if a TLAS includes a car object, then a BLAS of a tire can be included four times. The same BLAS can also be included in or referenced by multiple TLASs, as illustrated in FIG. 4A.

In some examples, a TLAS can be created using an Object-To-World matrix, which transforms an input represented in object-space coordinates to an output representation in world-space coordinates. A World-To-Object matrix can apply the transformation in the opposite direction (e.g., transforming an input represented in world-space coordinates to an output representation in object-space coordinates). In some cases, a TLAS can be built over a set of BLASs by using the Object-To-World matrix to compute the world-space AABB of each BLAS (e.g., the world-space AABB of the BLAS root nodes 442 and 462). A BVH is then built over these world-space AABBs of the BLAS root nodes and can be referred to as a top level BVH or the TLAS 410. In some cases, TLAS and BLAS creation can be performed using a similar or identical technique. For example, the same SAH-based (Surface Area Heuristic) algorithm or approach can be utilized for both TLAS and BLAS construction.

Figure 4B:
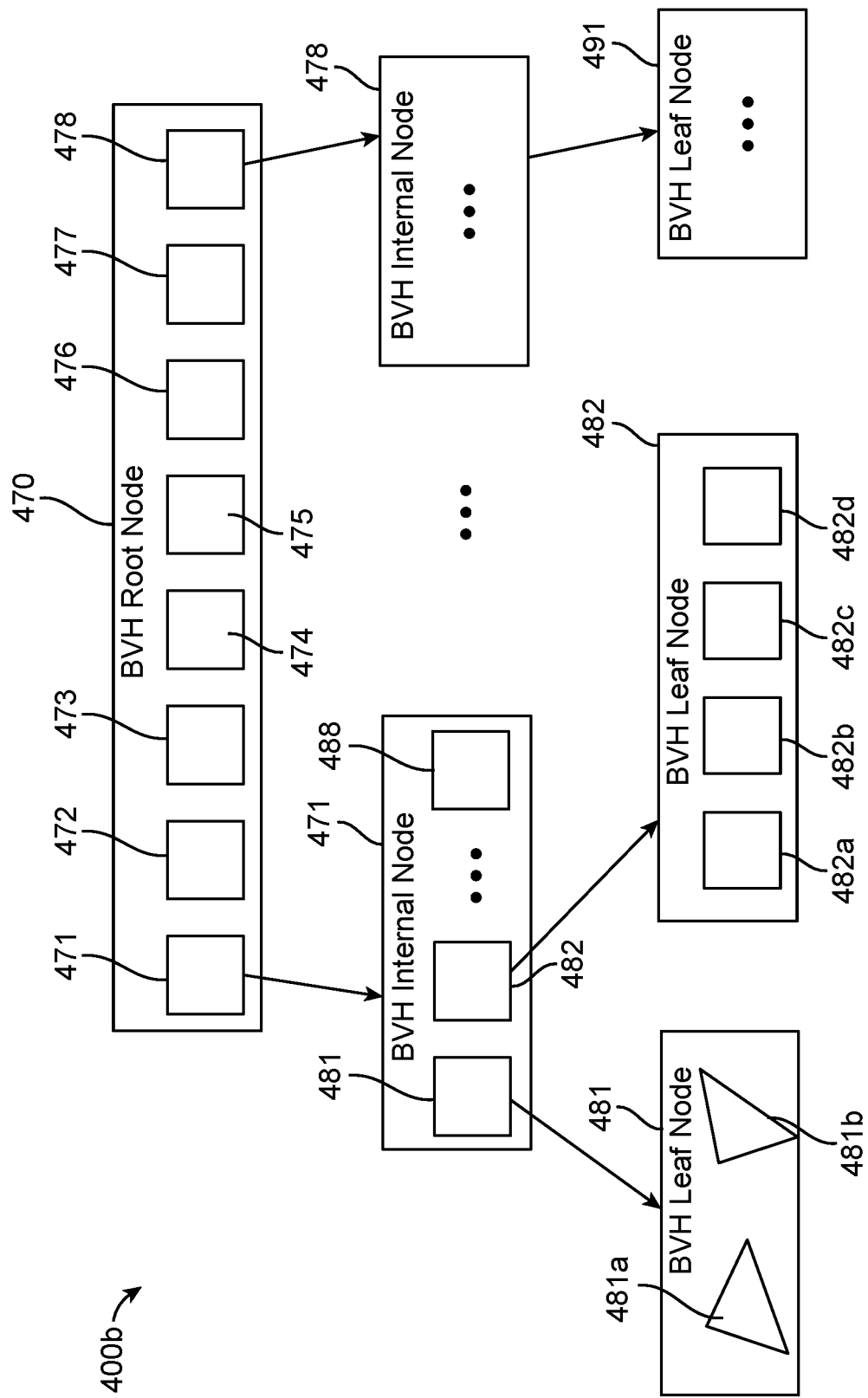
FIG. 4B illustrates an example of an acceleration data structure that includes leaf nodes containing triangles and leaf nodes containing bounding volumes, in accordance with some examples.

FIG. 4B is a diagram illustrating an example of an acceleration data structure 400b that includes or stores both triangles and bounding volumes. In some examples, acceleration data structure 400b can be a BVH (e.g., as is illustrated in FIG. 4B), although it is noted that other hierarchical tree structures and/or other acceleration data structures can also be utilized. As illustrated in FIG. 4B, acceleration data structure 400b (e.g., a BVH) includes a BVH root node 460 that includes a plurality of bounding volumes 471-478. The bounding volumes 471-478 can correspond to or otherwise be constructed for the child nodes of BVH root node 460. For instance, the eight bounding volumes 471-478 can be AABBs for eight corresponding child nodes of the BVH root node 460.

In the example of FIG. 4B, the acceleration data structure 400b has a branching factor of eight. The branching factor of an acceleration data structure is the maximum number of child nodes that may be associated with or contained by any parent node within the acceleration data structure. The number of child nodes associated with some internal nodes can be less than the branching factor. For example, acceleration data structure 400b has a branching factor of eight, but some internal nodes within acceleration data structure 400b may have less than eight child nodes. It is noted that a larger or smaller branching factor can also be used to generate an acceleration structure such as the acceleration data structure 400b. In cases where acceleration data structure 400b uses a larger or smaller branching factor, the BVH root node 460 and/or the BVH internal nodes (e.g., shown here as BVH internal nodes 471-478) can likewise include a greater or lesser number of bounding volumes or AABBs.

As mentioned above, BVH root node 460 includes AABBs for its eight child nodes 471-478. In some examples, the AABBs for child nodes 471-478 can be stored in the data structure of BVH 400b (e.g., included in the data representation of the parent node). For instance, the BVH root node 460 can include indices to data storage or memory locations where one or more of its child nodes 471-478 can be obtained or retrieved. In one illustrative example, the BVH root node 460 includes an index to only the first child node (e.g., the BVH internal node 471), with the remaining child nodes (e.g., nodes 472-478) stored adjacent to the memory index of the first child node 471.

Child node 471 is depicted in FIG. 4B as a BVH internal node 471, as node 471 is neither a root nor a leaf of BVH 400b. Internal nodes of BVH 400b (e.g., such as node 471) can have a number of child nodes that is lesser than or equal to the branching factor, which for BVH 400b is eight. In some examples, internal BVH nodes (e.g., such as node 471) can contain a bounding volume or AABB for each of their child nodes, as previously described above with respect to the BVH root node 460. BVH internal node 471 contains a plurality of bounding volumes 481-488, which in this case represent the eight child nodes of internal node 471. As illustrated in FIG. 4B, the child nodes of internal node 471 are BVH leaf nodes (e.g., leaf nodes of the BVH acceleration data structure 400b).

For example, the child nodes of internal node 471 include BVH leaf node 481 and BVH leaf node 482 (internal node 471 includes additional child nodes 483-488, which are omitted from the leaf node layer of FIG. 4B for clarity). As illustrated, BVH leaf node 481 includes two triangles 481a and 481b, which are geometric primitives that can be used to build a scene object or model represented by the BVH 400b. In some cases, the triangles 481a-481b can be enclosed by the corresponding AABB that is stored in internal node 471 for the BVH leaf node 481. In one illustrative example, the coordinates of the triangles 481a-481b can be stored directly in the underlying data structure of BVH 400b rather than being retrieved from an external data store or data location. For example, the coordinates (e.g., vertices) of triangles 481a-481b can be stored in the BVH leaf node 481 itself.

FIG. 4B depicts BVH leaf node 482 as including four bounding volumes (e.g., AABBs) 482a, 482b, 482c and 482d. In one illustrative example, the bounding volumes 482a-482d can be AABBs of procedural primitives (e.g., representing spheres or other user-defined shapes). In some examples, the bounding volumes 482a-482d can be AABBs of instances of BVHs. As was described above with respect to the BVH leaf node 481, it is noted that the four bounding volumes 482a-482d can be enclosed by the corresponding AABB that is stored in internal node 471 for the BVH leaf node 472. Although FIG. 4B depicts the BVH internal node 471 as including child nodes that contain triangles (e.g., BVH leaf node 481) and child nodes that contain bounding volumes (e.g., BVH leaf node 482), in some examples the BVH acceleration data structure 400b as a whole may include only leaf nodes that contain triangles or may include only leaf nodes that contain bounding volumes.

In some examples, a ray tracing process can include multiple different stages. For example, the stages of an example ray tracing process may include: bounding volume hierarchy (BVH) construction and refinement, ray generation, BVH traversal, ray-triangle intersection, and ray-box intersection. There may also be different steps during BVH construction, including partitioning triangles into multiple groups, forming a bounding box around each group, and recursively partitioning each group. Additionally, different partitioning schemes may be used during BVH construction, which may result in a certain number of possible solutions, e.g., $2^{n(log(n))}$ solutions. One or more of these improved solutions may yield improved ray tracing performance.

Aspects of ray tracing may also utilize various bounding volume hierarchy algorithms, such as split bounding volume hierarchy (SBVH) and linear bounding volume hierarchy (LBVH). In some cases, SBVH may result in slower build times and better quality compared to LBVH. Likewise, LBVH may result in faster build times and poorer quality compared to SBVH. In some cases, a ray tracing process may utilize bounding volume hierarchy refinement. For example, in bounding volume hierarchy refinement, given a binary BVH with one triangle per leaf, ray tracing techniques can be used to permute the tree topology (e.g., the tree topology of the binary BVH). In some aspects, bounding volume hierarchy refinement may utilize different algorithms (e.g., a treelet restructuring BVH (TRBVH), a parallel reinsertion BVH (PRBVH), etc.). In some examples, a ray tracing process may utilize BVH widening, which may convert a binary tree (e.g., a BVH) to a wide BVH (e.g., an 8-branch wide BVH). In some examples of BVH widening, an internal node may include up to eight AABBs and a leaf node may include up to four primitives or triangles.

A binary BVH can organize a set of primitives (e.g., triangles, AABBs, etc.) into multiple hierarchical levels, wherein the set of primitives are included in a bottom level of the hierarchy. For example, a binary BVH can include a root node having two child nodes that are each internal nodes of the binary BVH. The internal nodes may themselves each have two child nodes, which can each be BVH internal nodes as well. At the bottom level of the binary BVH, a BVH internal node can have up to two child nodes that are each leaf nodes of the binary BVH. In the binary BVH, each BVH leaf node may include one scene primitive (e.g., one triangle, one AABB, etc.).

BVH widening can be applied to or otherwise performed for a given BVH (e.g., such as a binary BVH) to reduce a depth of the given BVH. For example, BVH widening can be performed for a binary BVH having multiple hierarchical levels in order to generate a widened BVH having fewer hierarchical levels (e.g., fewer hierarchical levels than the input binary BVH). In some examples, a widened BVH can include only two levels (e.g., a root node and a plurality of leaf nodes associated with the root node). Whereas a binary BVH may include up to two primitives per BVH leaf node, in some aspects a widened BVH can include two or more primitives per BVH leaf node. In some examples, a widened BVH can include one or more wide BVH internal nodes each associated with up to eight child nodes. The up to eight child nodes of a wide BVH internal node can include additional wide BVH internal nodes, wide BVH leaf nodes, or a combination of the two. In some cases, a wide BVH leaf node can include or otherwise be associated with up to four triangles.

In some examples, BVH widening techniques can generate a widened BVH based on determining one or more cost metrics associated with a binary BVH. For example, BVH widening can be performed based on a Surface Area Heuristic (SAH) determined for or associated with an input binary BVH. Up to four triangles can be assigned to a given wide BVH leaf node based on SAH. In some cases, storing four triangles per leaf node (e.g., per wide BVH leaf node) may increase a node size associated with the wide BVH. For example, a node size may be 64 bytes, which can be insufficient for storing four triangles (e.g., which may require up to 144 bytes of storage if uncompressed).

In some cases, compression can be performed for some (or all) of the wide BVH nodes included in a wide BVH. For example, a binary BVH can be widened into a wide BVH (e.g., an 8-wide BVH with up to eight internal child nodes) based on SAH. Compression can be performed for some, or all, of the resulting wide BVH leaf nodes. In some cases, a compressed BVH leaf node may be larger than a pre-determined size (e.g., 64 bytes). For example, a compressed BVH leaf node may be larger than 64 bytes when the compressed BVH node includes four triangles with little to no redundancy between them. When a compressed BVH leaf node is (or would be) larger than the pre-determined size (e.g., 64 bytes), at compression time, the uncompressed BVH leaf node may be split into multiple BVH leaf nodes that are compressible. For example, the uncompressed BVH leaf node may be converted to a BVH internal node, with the multiple new, compressible BVH leaf nodes forming the children of the newly created BVH internal node.

Splitting one or more wide BVH leaf nodes into multiple, compressible child nodes can introduce additional hierarchical layers and complexity to the widened BVH and may result in a sub-optimal widened BVH. There is a need for systems and techniques that can be used to perform BVH widening and leaf node compression without generating multiple, compressible child nodes for uncompressible wide BVH leaf nodes.

As noted previously, systems and techniques are described herein that can provide compression aware BVH widening. For example, the systems and techniques can determine or predict a compressibility of one or more BVH leaf nodes, and the predicted compressibility information can be used to perform BVH widening without generating one or more wide BVH nodes that are uncompressible (e.g., cannot be compressed within a pre-determined or fixed number of bytes). In one illustrative example, BVH widening can be performed based on predicting whether a candidate hierarchical acceleration data structure leaf node (e.g., a candidate wide BVH leaf node) can be compressed within 64 bytes. If the candidate wide BVH leaf node is compressible using 64 bytes, then the BVH widening can include the candidate wide BVH leaf node. If the candidate wide BVH leaf node is not compressible using 64 bytes, then the BVH widening can exclude the candidate wide BVH leaf node from consideration.

Figure 5:
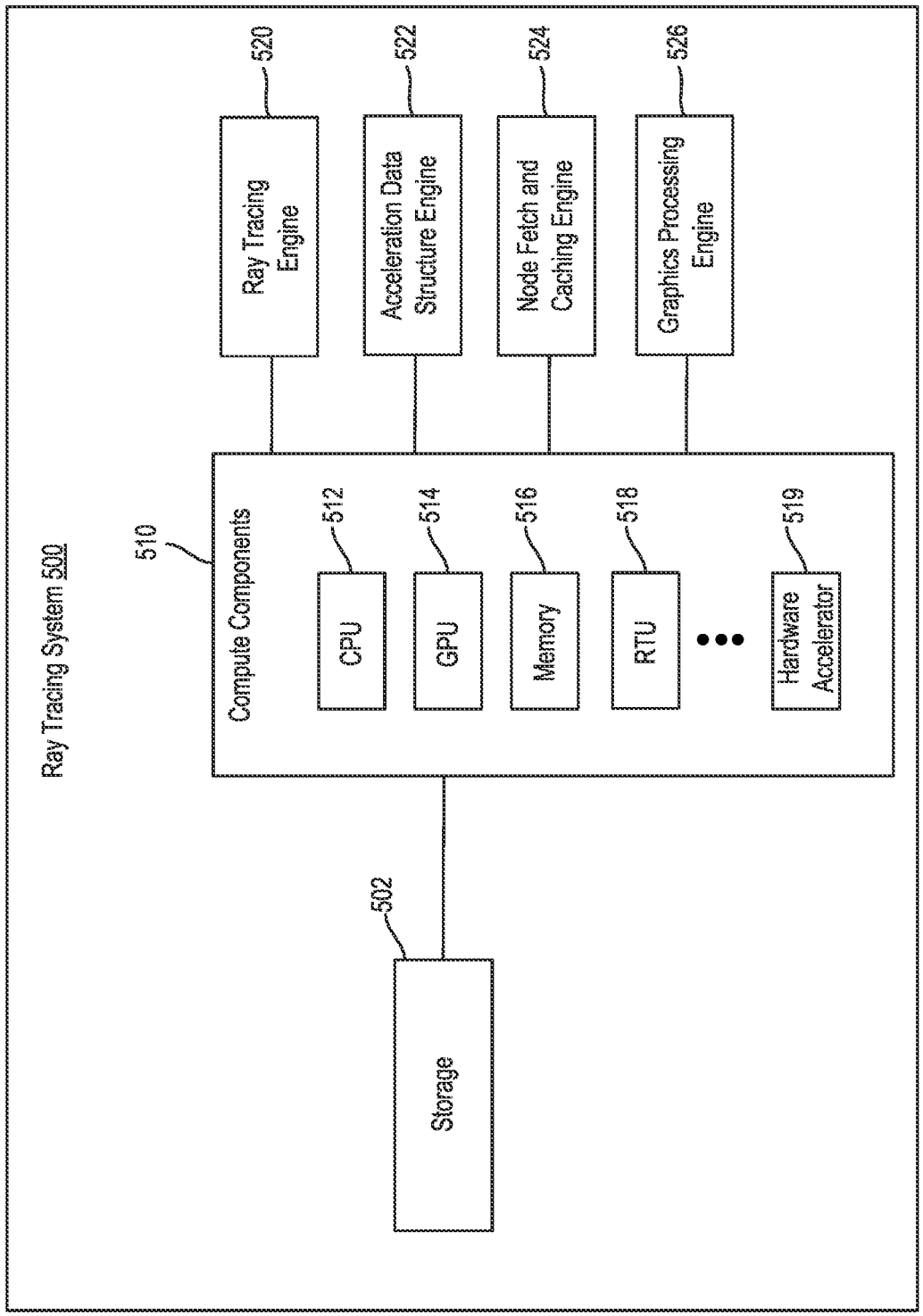
FIG. 5 is a simplified block diagram illustrating an example ray tracing system, in accordance with some examples.

FIG. 5 is a diagram illustrating an example ray tracing system 500, in accordance with some examples of the disclosure. The ray tracing system 500 can implement the systems and techniques disclosed herein, including aspects described above and aspects associated with FIGS. 6A-7. The ray tracing system 500 can perform various tasks and operations such as, for example, ray tracing tasks and operations (e.g., ray-primitive intersection, ray-bounding volume intersection, ray-triangle intersection, ray-AABB intersection, acceleration data structure construction and/or updating, rendering, etc.).

In the example shown in FIG. 5, the ray tracing system 500 includes storage 502, compute components 510, a ray tracing engine 520, an acceleration data structure engine 522, a node fetch and caching engine 524, and a graphics processing engine 526. It should be noted that the components 502 through 526 shown in FIG. 5 are non-limiting examples provided for illustration and explanation purposes, and other examples can include more, less, and/or different components than those shown in FIG. 5. For example, in some cases the ray tracing system 500 can include one or more display devices, one more other processing engines, one or more other hardware components, and/or one or more other software and/or hardware components that are not shown in FIG. 5. An example architecture and example hardware components that can be implemented by the ray tracing system 500 are further described below with respect to FIG. 8.

References to any of the components of the ray tracing system 500 in the singular or plural form should not be interpreted as limiting the number of such components implemented by the ray tracing system 500 to one or more than one. For example, references to a processor in the singular form should not be interpreted as limiting the number of processors implemented by the ray tracing system 500 to one. One of ordinary skill in the art will recognize that, for any of the components shown in FIG. 5, the ray tracing system 500 can include only one of such component(s) or more than one of such component(s).

The ray tracing system 500 can be part of, or implemented by, a single computing device or multiple computing devices. In some examples, the ray tracing system 500 can be part of an electronic device (or devices) such as a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, an extended reality (XR) device (e.g., a VR headset or had-mounted display (HMD), an AR headset, HMD, or glasses, etc.), or any other suitable electronic device(s).

In some implementations, the storage 502, compute components 510, ray tracing engine 520, acceleration data structure engine 522, node fetch and caching engine 524, and graphics processing engine 526 can be part of the same computing device. For example, in some cases, the storage 608, compute components 510, ray tracing engine 520, acceleration data structure engine 522, and graphics processing engine 526 can be integrated into a smartphone, laptop, tablet computer, smart wearable device, gaming system, and/or any other computing device. In other implementations, the storage 502, compute components 510, ray tracing engine 520, acceleration data structure engine 522, and graphics processing engine 526 can be part of two or more separate computing devices. For example, in some cases, some of the components 502 through 526 can be part of, or implemented by, one computing device and the remaining components can be part of, or implemented by, one or more other computing devices.

The storage 502 can be any storage device(s) for storing data. Moreover, the storage 502 can store data from any of the components of the ray tracing system 500. For example, the storage 502 can store data from the compute components 510, data from the ray tracing engine 520, data from the acceleration data structure engine 522, data from the node fetch and caching engine 524, and/or data from the graphics processing engine 526. In some examples, the storage 502 can include one or more buffers and/or caches for storing data for processing by the compute components 510. In some examples, the one or more buffers and/or caches can be general-use and available to some (or all) of the compute components 510. In some examples, the one or more buffers and/or caches can be provided specific to particular ones of the compute components 510.

The compute components 510 can include a central processing unit (CPU) 512, a graphics processing unit (GPU) 514, a memory 516, a Ray Tracing Unit 518, and/or one or more hardware accelerator components 519. In some implementations, the compute components 510 can include other processors or compute components, such as one or more digital signal processors (DSPs), one or more neural processing units (NPUs), and/or other processors or compute components. The compute components 510 can perform various operations such as ray-primitive intersection, ray-bounding volume intersection, ray-AABB intersection, acceleration data structure construction, acceleration data structure updating, scene rendering, rasterization, geometry processing, pixel processing, visibility processing, etc.

The operations for the ray tracing engine 520, the acceleration data structure engine 522, the node fetch and caching engine 524, and the graphics processing engine 526 (and any other processing engines) can be implemented by any of the compute components 510. In some cases, the operations of one or more of the ray tracing engine 520, the acceleration data structure engine 522, the node fetch and caching engine 524, and the graphics processing engine 526 can be executed by the CPU 512. In one illustrative example, the operations of one or more of the ray tracing engine 520, the acceleration data structure engine 522, the node fetch and caching engine 524, and the graphics processing engine 526 can be executed by the GPU 514. In some cases, the operations of one or more of the ray tracing engine 520, the acceleration data structure engine 522, the node fetch and caching engine 524, and the graphics processing engine 526 can be executed by the RTU 518 and/or the one or more hardware accelerators 519.

In some cases, the operations of one or more of the ray tracing engine 520, the acceleration data structure engine 522, the node fetch and caching engine 524, and the graphics processing engine 526 can be executed by one or more combinations of CPU 512, GPU 514, RTU 518, and hardware accelerators 519. In some cases, the compute components 510 can include other electronic circuits or hardware, computer software, firmware, or any combination thereof, to perform any of the various operations described herein.

In some examples, the ray tracing engine 520 can include one or more ray tracing Application Programming Interfaces (APIs). In one example, the ray tracing engine 520 can include one or more ray intersection engines. For example, ray tracing engine 520 can include one or more ray-primitive intersection engines and/or can include one or more ray-bounding volume intersection engines. In some cases, ray tracing engine 520 can include one or more ray-triangle intersection engines and/or can include one or more ray-AABB intersection engines. In some examples, the ray tracing engine 520 can implement one or more ray intersection engines using one or more hardware-accelerated ray tracing units (RTUs) and/or arithmetic logic units (ALUs).

In one illustrative example, the ray tracing engine 520 can communicate with RTU 518 (and/or hardware accelerators 519) to perform ray-primitive (e.g., ray-triangle) intersections and/or ray-bounding volume (e.g., ray-AABB) intersections. For example, in some cases the ray tracing engine 520 can provide one or more inputs and/or control signals to RTU 518 (and/or hardware accelerators 519). RTU 518 (and/or hardware accelerators 519) can use the inputs and control signals from ray tracing engine 520 to perform ray-primitive intersections and/or ray-bounding volume intersections and can communicate the ray intersection results back to ray tracing engine 520.

In some examples, the acceleration data structure engine 522 can construct or generate one or more acceleration data structures. The acceleration data structures generated by acceleration data structure engine 522 can be used by one or more of ray tracing engine 520, the node fetch and caching engine 524, and graphics processing engine 526. In one illustrative example, acceleration data structure engine 522 can construct or generate a Bounding Volume Hierarchy (BVH). In some cases, acceleration data structure engine 522 can generate two-level acceleration structures (e.g., an acceleration data structure including a TLAS and one or more BLASs). The acceleration data structure engine 522 can be implemented using the CPU 512, the GPU 514, or a combination of the two. In some examples, the acceleration data structure engine 522 can additionally, or alternatively, be implemented using one or more of the dedicated hardware accelerator components 519.

In some examples, the graphics processing engine 526 can include a graphics processing pipeline. For example, graphics processing engine 526 can include, but is not limited to, one or more of a geometry processing stage, a visibility stage, a rasterization stage, and a pixel processing pipeline. In some examples, graphics processing engine 526 can communicate with or access the memory 516 of the compute components 510. Memory 516 can include one or more of a system memory, a frame buffer, a graphics memory, one or more caches, etc. In some examples, graphic processing engine 526 can communicate with one or more of the RTU 518 and/or hardware accelerators 519 (e.g., of the compute components 510) and/or the ray tracing engine 520.

In some cases, the ray tracing system 500 (e.g., using the ray tracing engine 520, the acceleration data structure engine 522, the node fetch and caching engine 524, and/or the graphics processing engine 526) can obtain an acceleration data structure that includes one or more primitives of a scene object. For example, the ray tracing system 500 can obtain the acceleration data structure from storage 502 and/or memory 516. In some cases, the acceleration data structure can be generated or constructed using the acceleration data structure engine 522.

The acceleration data structure engine 522 can obtain one or more representations of a scene object or other scene geometry and generate and/or update a BVH or other acceleration data structure that includes the scene object or scene geometry. In some examples, the acceleration data structure engine 522 can obtain representations of a scene object or other scene geometry at least in part from one or more of the storage 502 and the memory 516. In some cases, the acceleration data structure engine 522 can obtain representations of a scene object or other scene geometry from the ray tracing engine 520 (and/or one or more of the compute components 510).

The acceleration data structure engine 522 can operate over representations of scene objects and scene geometry using both object-space representations and world-space representations. In some examples, the acceleration data structure engine 522 can use one or more Object-To-World matrices and/or World-To-Object matrices to transform scene objects/geometry from object-space representations into world-space representations, and from world-space representations to object-space representations, respectively.

Figure 6:
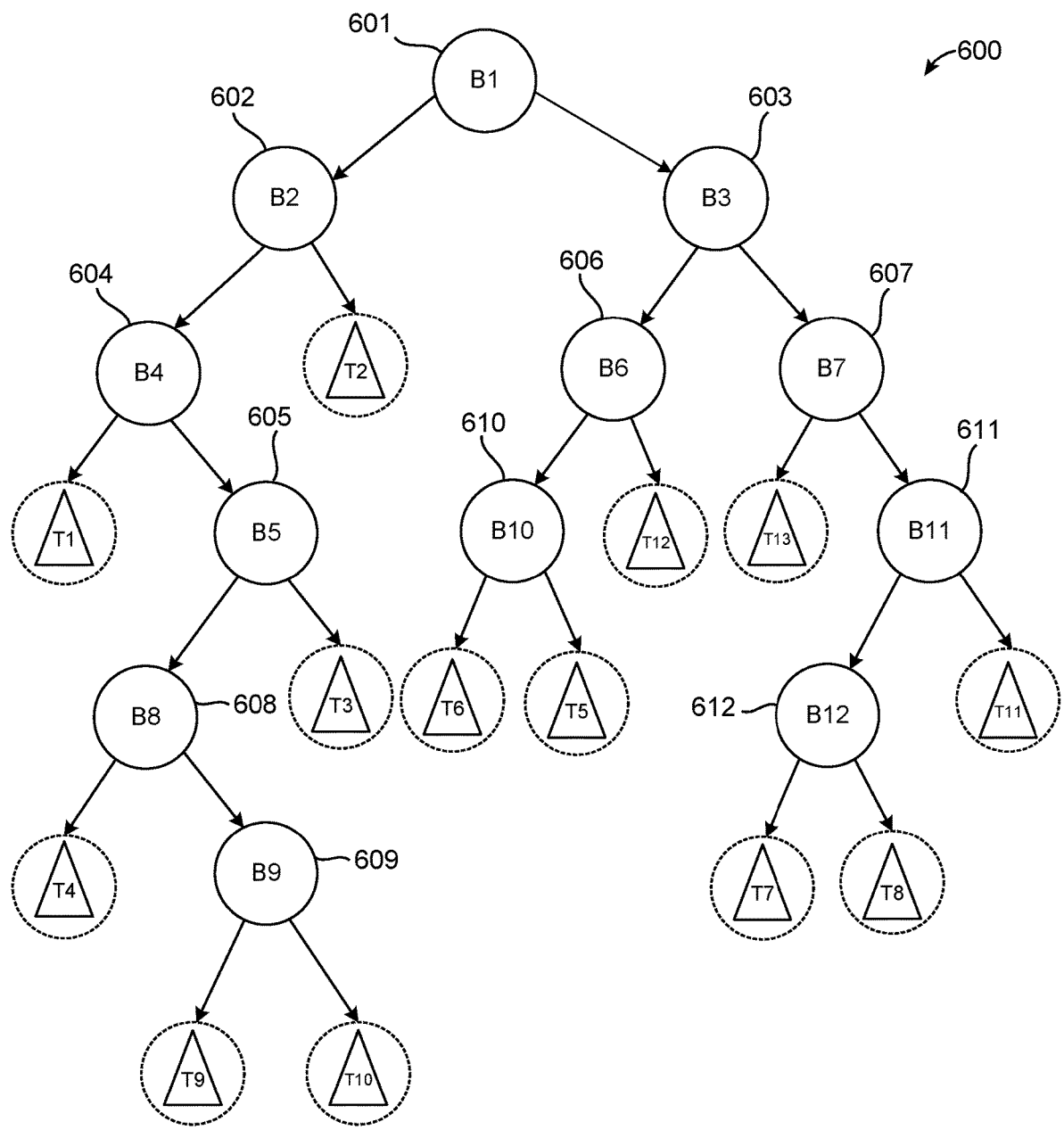
FIG. 6 illustrates an example of a binary bounding volume hierarchy (BVH) organizing one scene primitive per leaf node, in accordance with some examples.

FIG. 6 depicts an example binary BVH 600 that includes a set of internal nodes and a set of leaf nodes. For example, binary BVH 600 includes the set of internal nodes B1-B12 (e.g., also referred to as the internal nodes 601-612, respectively). In some cases, node B1 can be a BVH root node that is not associated with a parent node. In some examples, node B1 can be a BVH internal node that is associated with a parent node (not depicted in FIG. 6).

As mentioned previously, a binary BVH (e.g., such as binary BVH 600) can include one bounding box per internal node. The bounding box can be an AABB. A given internal node can store the bounding box (e.g., AABB) that encloses both of its child nodes. For example, node B1 can store the AABB that encloses its child internal nodes B2 and B3; node B3 can store the AABB that encloses its child internal nodes B6 and B7; etc.

In some cases, an internal node stores an AABB that encloses the respective AABBs of its two child nodes, wherein the two child nodes are both internal nodes of binary BVH 600 (e.g., such as the examples described above). In some cases, the two child nodes can include one internal node and one leaf node. In a binary BVH (e.g., such as binary BVH 600), each leaf node can store one triangle. For example, the internal node B2 can store the AABB that encloses its child internal node B4 and the AABB that encloses the leaf node associated with triangle T2. In some cases, the two child nodes of a given internal node can both be leaf nodes. For example, the two child nodes of BVH internal node B9 are BVH leaf nodes storing the triangles T9 and T10, respectively; the two child nodes of BVH internal node B12 are BVH leaf nodes storing the triangles T7 and T8, respectively; etc.

In some aspects, a binary BVH (e.g., such as binary BVH 600) can be inefficient to traverse during one or more ray tracing operations. For example, based on a binary BVH including only a single primitive (e.g., triangle) per leaf node and a single bounding box (e.g., AABB) per internal node, a binary BVH can include multiple hierarchical layers that must be traversed prior to reaching a leaf node that stores triangles or other scene primitives. For example, to reach the leaf node storing triangle T10, the example binary BVH 600 must be traversed from B1-B2-B4-B5-B8-B9 prior to reaching the leaf node storing triangle T10.

Figure 7A:
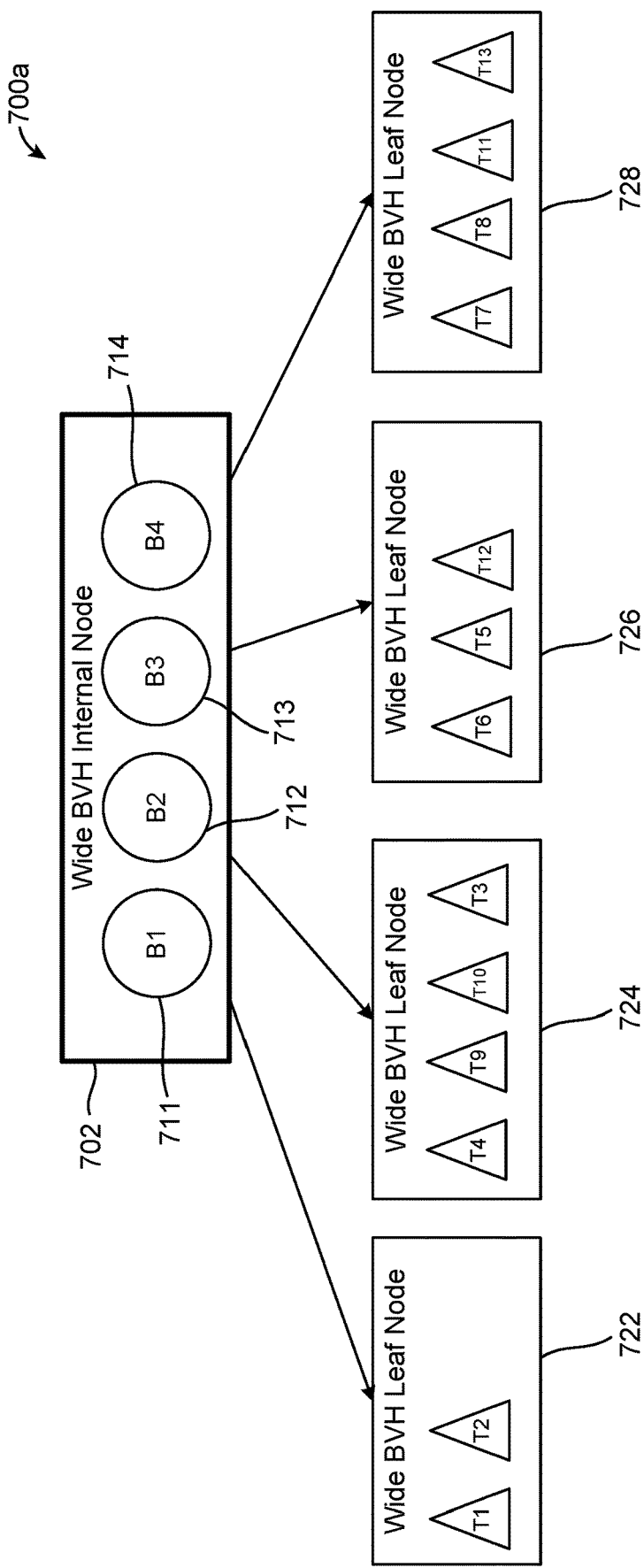
FIG. 7A illustrates an example of an 8-wide BVH based on widening the binary BVH depicted in FIG. 6, in accordance with some examples.

In some examples, BVH widening can be performed to widen a binary BVH (e.g., binary BVH 600) and reduce the number of hierarchical layers between the root node and the BVH leaf nodes storing triangles or other scene primitives. FIG. 7A illustrates an example widened BVH 700a that includes a wide BVH internal node 702 and four wide BVH leaf nodes 722, 724, 726, 728. In one illustrative example, the wide BVH internal node 702 can include the same thirteen triangles T1-T13 as were depicted in the binary BVH 600 of FIG. 6.

BVH widening can be performed based on one or more cost metrics, which may include a Surface Area Heuristic (SAH). In some aspects, an SAH can be determined for or associated with each node of a given BVH and/or a given BVH hierarchical level. The SAH can be used to provide an estimate of the ray tracing performance of a portion (or all) of a BVH or other acceleration data structure. In some examples, the BVH nodes of a given BVH level can be sorted by SAH in increasing order or decreasing order. For example, the BVH nodes can be sorted by SAH such that the node with the smallest SAH is traversed first and the node with the largest SAH is traversed last; BVH nodes may alternatively be sorted by SAH such that the node with the smallest SAH is traversed last and the node with the largest SAH is traversed first. Various other SAH sort orders and/or traversal orders may also be utilized, based on the SAH being used to provide an estimate of the ray tracing performance of some (or all) of a given BVH.

In one illustrative example, BVH widening can be performed for binary BVH 600 to generate the widened BVH 700a based on SAH optimization. For example, widened BVH 700a can be the BVH with the lowest SAH that includes all thirteen of the triangles T1-T13 included in the original (e.g., input) binary BVH 600. The widened BVH 700a includes two hierarchical levels (e.g., a top level that includes the wide BVH internal node 702 and a bottom level that includes the wide BVH leaf nodes 722-728). Widened BVH 700a can be used to accelerate ray tracing performance based on reducing an average traversal time of the widened BVH 700a.

For example, to reach the leaf node storing triangle T10 in binary BVH 600 (e.g., illustrated in FIG. 6) required traversal from B1-B2-B4-B5-B8-B9 prior to reaching the leaf node storing triangle T10, the leaf node storing triangle T10 in widened BVH 700a can be reached by traversing from wide BVH internal node 702 to wide BVH leaf node 724.

In one illustrative example, widened BVH 700a can be an 8-wide BVH. An 8-wide BVH can include up to eight child nodes per internal node (e.g., the wide BVH internal node 702 can include up to eight child nodes, although only four are depicted in FIG. 7A). Leaf nodes of the 8-wide BVH can include up to four triangles or other scene primitives. For example, wide BVH leaf nodes 724 and 728 include four triangles each (e.g., wide BVH leaf node 724 includes triangles T4, T9, T10, and T3; wide BVH leaf node 728 includes triangles T7, T8, T11, and T13).

As mentioned previously, the transformation of binary BVH 600 to the 8-wide BVH 700a can reduce the number of hops that a GPU or other processor traverses when performing ray tracing operations (e.g., such as ray-box intersections, ray-triangle intersections, etc.). However, as also mentioned previously, the amount of storage space needed to store the up to four triangles in a given leaf node can be greater than a pre-determined maximum size of each leaf node. For example, the maximum size of a leaf node (and/or each node included in the 8-wide BVH 700a) can be 64 bytes. In some cases, the uncompressed data associated with storing four triangles can be 144 bytes in size (e.g., each uncompressed triangle may require 36 bytes of storage), which exceeds the 64-byte maximum size of each leaf node.

One or more compression algorithms can be used to compress BVH leaf nodes that exceed the pre-determined maximum size (e.g., 64 bytes). In some cases, compression is performed based on one or more redundancies that are present in the underlying data associated with the triangles stored in a given BVH leaf node. For example, compression can be performed to eliminate or reduce the storage requirements associated with redundancies such as shared vertices between two or more triangles stored in a given BVH leaf node, shared or overlapping areas enclosed by two or more triangles stored in a given BVH leaf node, etc.

In some cases, a widened BVH leaf node (e.g., such as one or more of the wide BVH leaf nodes 722-728 illustrated in FIG. 7A) may not be compressible to a size that is smaller than the pre-determined maximum node size. For example, the four triangles T4, T9, T10, and T3 that are stored in wide BVH leaf node 724 may be associated with a compressed size that exceeds the 64-byte maximum size of wide BVH leaf node 724. In some examples, the four triangles T4, T9, T10, and T3 may not be compressible within 64 bytes based on a lack of redundancy in the underlying data associated with triangles T4, T9, T10, and T3 (e.g., the four triangles may not have any shared vertices or overlapping areas for which compression can be performed). In some aspects, a wide BVH leaf node that cannot be compressed to 64 bytes or smaller may also be referred to herein as "uncompressible" and/or as an "uncompressible leaf node."

In some examples, uncompressible leaf nodes are split into multiple smaller leaf nodes that are each compressible. The uncompressible leaf node can be converted to an internal node of the BVH, and the multiple smaller leaf nodes that are each compressible are assigned as new child nodes (e.g., of the internal node converted from the uncompressible leaf node).

Figure 7B:
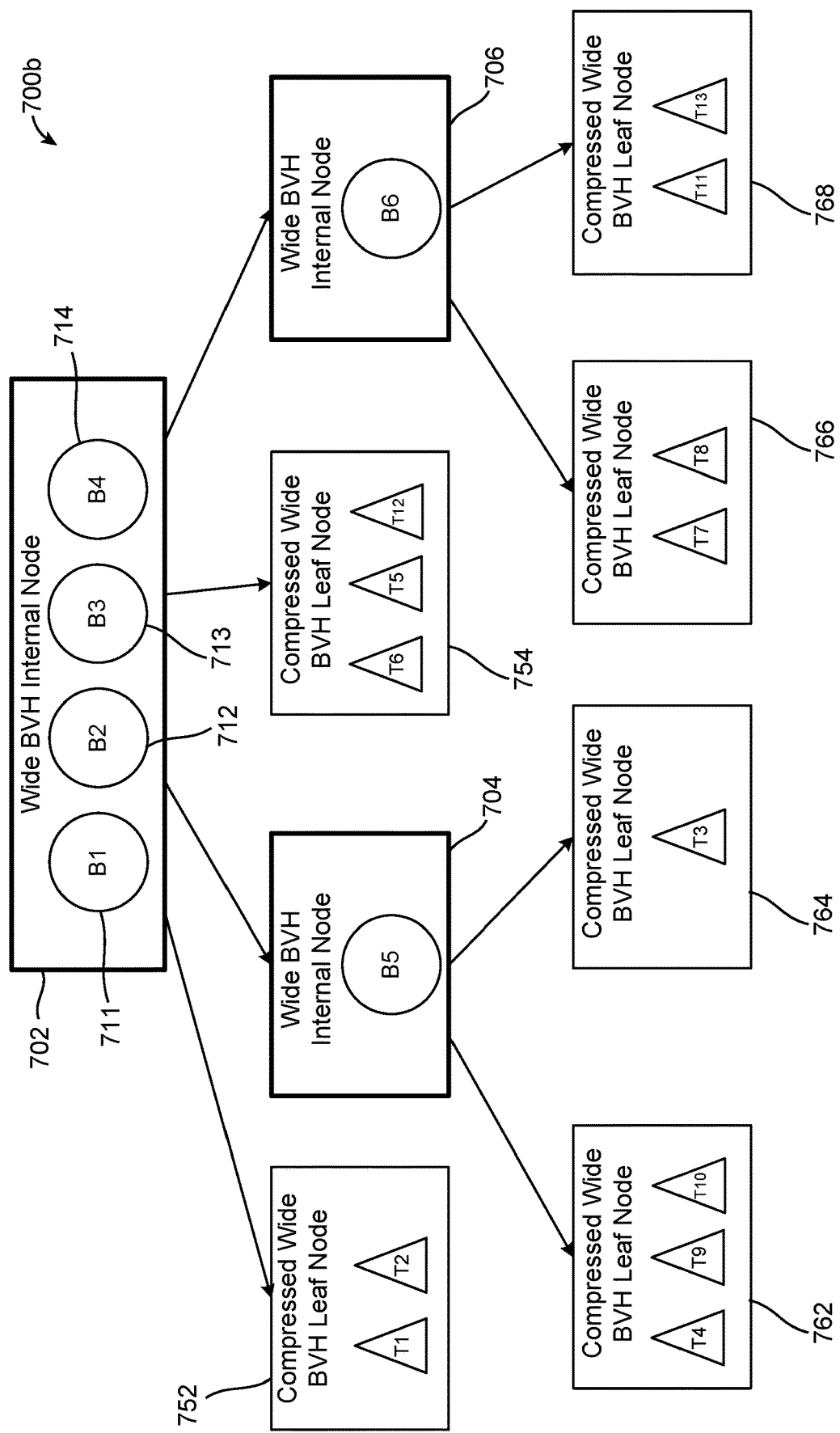
FIG. 7B illustrates an example of an 8-wide compressed BVH that may be generated based on performing widening and compression for the binary BVH depicted in FIG. 6, in accordance with some examples.

For example, FIG. 7B illustrates a widened and compressed BVH 700b. In some aspects, the widened and compressed BVH 700b can be an 8-wide compressed BVH that is generated based on performing leaf node compression for the optimal 8-wide BVH 700a depicted in FIG. 7A. For example, the compressed wide BVH leaf node 752 can store compressed data associated with the triangles T1 and T2, which are the same two triangles stored in the corresponding non-compressed wide BVH leaf node 722 illustrated in FIG. 7A (e.g., the wide BVH leaf node 722 of FIG. 7A is compressible into the compressed wide BVH leaf node 752 of FIG. 7B). Similarly, the compressed wide BVH leaf node 754 can store compressed data associated with the triangles T6, T5, and T12, which are the same three triangles stored in the corresponding non-compressed wide BVH leaf node 726 illustrated in FIG. 7A (e.g., the wide BVH leaf node 726 of FIG. 7A is compressible into the compressed wide BVH leaf node 754 of FIG. 7B).

The non-compressed wide BVH leaf node 724 illustrated in FIG. 7A may be uncompressible (e.g., based on including the four triangles T4, T9, T10, and T3, which together may exceed the 64-byte maximum node size even once compressed). In some aspects, as mentioned previously, the widened and compressed BVH 700b of FIG. 7B can be generated based on converting each uncompressible wide leaf node to an internal node, and splitting the triangles associated with the uncompressible wide leaf node into multiple new child nodes. For example, the uncompressible wide BVH leaf node 724 of FIG. 7A can be converted to the wide BVH internal node 704 depicted in FIG. 7B, and the triangles T4, T9, T10, and T3 can be split into two new child nodes, the compressed wide BVH leaf node 762 (e.g., storing compressed data associated with triangles T4, T9, and T10) and the compressed wide BVH leaf node 764 (e.g., storing compressed data associated with triangle T3).

Similarly, the non-compressed wide BVH leaf node 728 illustrated in FIG. 7A may be uncompressible (e.g., based on including the four triangles T7, T8, T11, and T13, which together may exceed the 64-byte maximum node size even once compressed). In some aspects, the uncompressible wide BVH leaf node 728 of FIG. 7A can be converted to the wide BVH internal node 706 depicted in FIG. 7B, and the triangles T7, T8, T11, and T13 can be split into two new child nodes, the compressed wide BVH leaf node 766 (e.g., storing compressed data associated with triangles T7 and T8) and the compressed wide BVH leaf node 768 (e.g., storing compressed data associated with triangles T11 and T13).

In some aspects, the 8-wide compressed BVH 700*b* that is implemented based on a maximum node size (e.g., such as 64 bytes) can be different than the calculated optimal 8-wide BVH 700*a* (e.g., optimal based on SAH), which may be calculated without reference to the maximum node size. For example, the calculated optimal 8-wide BVH 700*a* illustrated in FIG. 7A may be the optimal 8-wide BVH for storing the thirteen triangles T1-T13 in a BVH that minimizes SAH. The optimization of the underlying binary BVH 600 (e.g., used to generate the optimal 8-wide BVH 700*a*) may be performed without analyzing the maximum node size (e.g., 64 bytes) and whether each candidate widened BVH leaf node included in the calculated optimal 8-wide BVH 700*a* is compressible in view of the maximum node size. For example, the calculated optimal 8-wide BVH 700*a* of FIG. 7A can generate the four widened BVH leaf nodes 722-728 based only on minimizing SAH (e.g., the calculated 8-wide BVH 700*a* of FIG. 7A can include one or more candidate widened BVH leaf nodes that are uncompressible within the maximum node size of 64 bytes).

Splitting uncompressible candidate widened BVH leaf nodes (e.g., such as the widened BVH leaf nodes 724 and 726 of FIG. 7A) into multiple new child nodes that are each small enough to be compressed within the maximum node size (e.g., 64 bytes) can increase the SAH of the resulting widened and compressed BVH 700*b*. For example, the compressed widened BVH 700*b* illustrated in FIG. 7B can have a larger SAH than the calculated optimal widened BVH 700*a* illustrated in FIG. 7A based on including more internal nodes and more leaf nodes. For example, the calculated optimal 8-wide BVH 700*a* illustrated in FIG. 7A includes only two layers, that each triangle of the thirteen triangles T1-T13 is reachable in a single traversal step from the root node 702. After compression is performed, the resulting compressed and widened BVH 700*b* includes three layers, such that only five of the thirteen triangles are reachable in a single traversal step from the root node 702 (e.g., the triangles T1, T2, T5, T6, and T12); the seven remaining triangles (e.g., T4, T9, T10, T3, T7, T8, T11, and T13) each require multiple traversal steps from the root node 702.

The systems and techniques described herein can be used to perform compression aware BVH widening, as will be described in greater depth below. In some examples, an estimate of leaf node compressibility can be determined and/or analyzed during BVH widening, such that the resulting widened BVH does not include any widened BVH nodes that are uncompressible (e.g., each widened BVH leaf node can be compressed into the maximum node size of 64 bytes or less).

In one illustrative example, based on determining an estimate or prediction of BVH leaf node compressibility prior to or during BVH widening, the systems and techniques can exclude from consideration one or more candidate hierarchical acceleration data structures. In some examples, the candidate hierarchical acceleration data structures can be candidate widened BVH tree configurations that include one or more BVH leaf nodes that cannot be compressed within the maximum node size (e.g., 64 bytes). In some aspects, a candidate widened BVH tree configuration can be excluded from consideration during BVH widening, even if the candidate widened BVH tree configuration is associated with a best SAH, based on the candidate widened BVH tree configuration including at least one uncompressible leaf node.

In some aspects, checking the compressibility of every possible leaf node combination and/or widened BVH configuration can be a computationally expensive and time-consuming process. In one illustrative example, the systems and techniques can perform compression prediction (e.g., compressibility prediction) to predict whether a given set of triangles received as input can be compressed within a given maximum node size. For example, the systems and techniques can perform compression prediction (e.g., compressibility prediction) to predict whether the set of triangles included in a given candidate widened BVH leaf node can be compressed using 64 bytes or less.

In some aspects, the systems and techniques can perform BVH widening for a given BVH (e.g., a binary BVH) based on determining a candidate widened BVH tree configuration with a best or optimal SAH and determining an estimate or prediction of leaf node compressibility for each leaf node included in the candidate widened BVH. If the estimate or prediction of leaf node compressibility is less than or equal to the maximum node size (e.g., 64 bytes), then a given candidate widened BVH can be output as the widened BVH for compression. For example, an output hierarchical acceleration data structure can be generated, wherein the output hierarchical acceleration data structure is the same as the given candidate widened BVH. In some outputs, the output hierarchical acceleration data structure can be generated to be the same as the candidate hierarchical acceleration data structure with a best or optimal cost metric (e.g., SAH) that also has a compressibility prediction that is less than or equal to a maximum node size. In response to determining that at least one leaf node included in the candidate widened BVH is associated with an estimate or prediction of compressibility (e.g., a compressibility prediction) that is greater than the maximum node size (e.g., 64 bytes), then the candidate widened BVH can be excluded and the candidate widened BVH tree configuration with the next best SAH can be considered using the same process described above until a candidate widened BVH is identified that does not include any uncompressible leaf nodes. In some examples, the candidate widened BVH leaf node compression check described above can be performed prior to or as a part of deciding whether to create the candidate widened BVH leaf node. For example, if a candidate widened BVH node passes the compression check (e.g., is compressible using 64 bytes or less), then the systems and techniques can add (e.g., create) the candidate widened BVH node to the widened BVH. If a candidate widened BVH node does not pass the compression check (e.g., is not compressible using 64 bytes or less), then the systems and techniques can assign a high cost (e.g., a high SAH) to the uncompressible candidate widened BVH node. In some examples, the systems and techniques can assign a highest cost (e.g., highest SAH) to an uncompressible candidate widened BVH node.

In some aspects, a compressibility metric associated with a candidate hierarchical acceleration data structure (e.g., BVH) can be determined based at least in part on a cost metric, such as an SAH or other cost metric. For example, a compressibility metric associated with a candidate hierarchical acceleration data structure (e.g., BVH) can be determined based at least in part on a SAH determined for the candidate hierarchical acceleration data structure. In one illustrative example, the compressibility metric can be determined in an order based on the cost metric (e.g., SAH) determined for two or more candidate BVHs. For example, a compressibility metric associated with a candidate BVH having a best (e.g., lowest or highest) cost metric (e.g., a lowest SAH) can be determined first. Subsequently, a compressibility metric associated with a different candidate BVH having a next best cost metric (e.g., next lowest SAH) can be determined in response to a determination that that the compressibility metric associated with the candidate BVH having the best cost metric (e.g., lowest SAH) is not below a pre-determined threshold. In some aspects, the pre-determined threshold can be a maximum size of a leaf node of the widened BVH. In one illustrative example, the pre-determined threshold can be 64 bytes.

Figure 8:
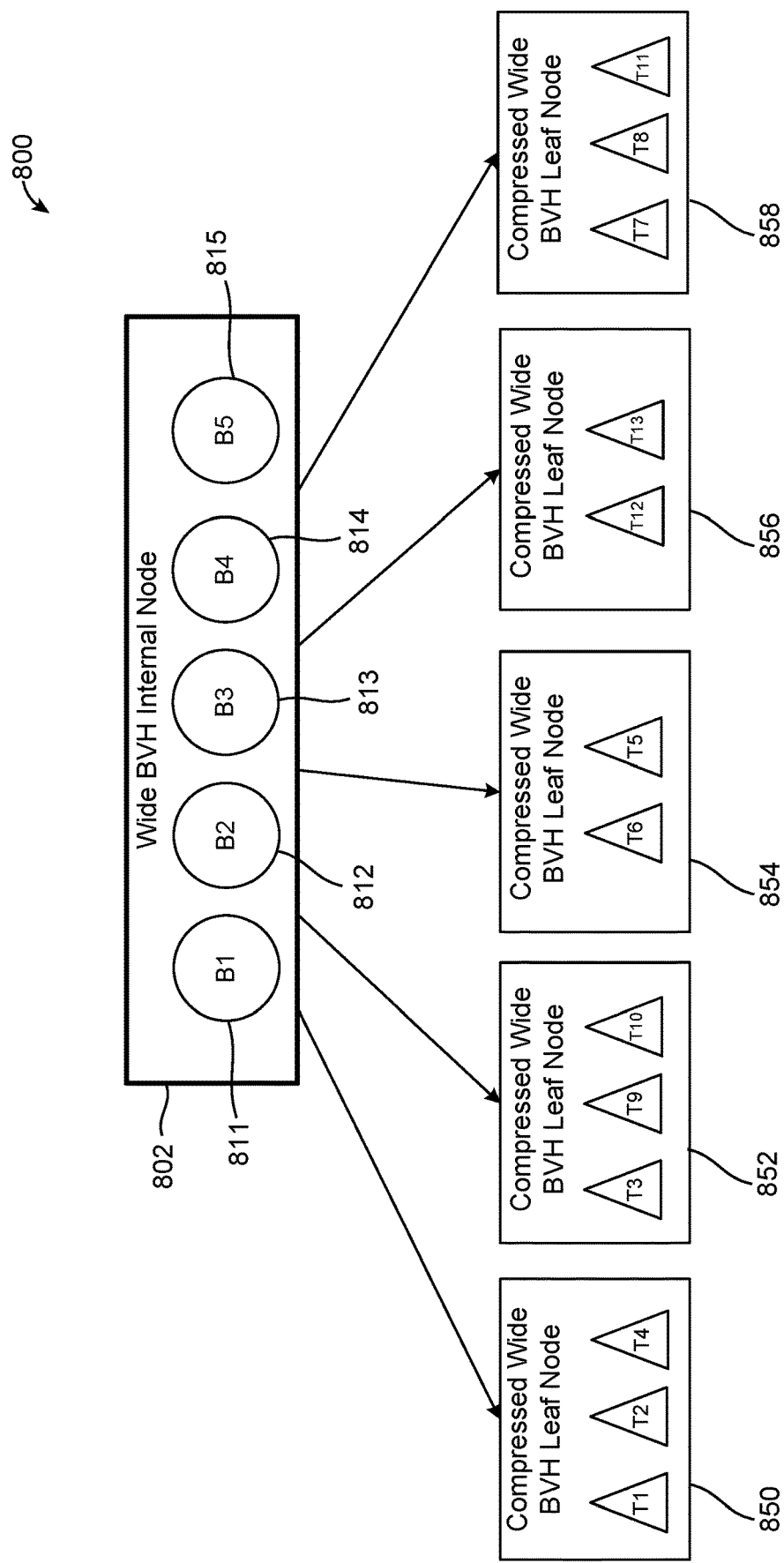
FIG. 8 illustrates an example of an 8-wide BVH that may be generated using leaf node compression prediction, in accordance with some examples.

FIG. 8 illustrates an example of a compression-aware, widened BVH 800. In some aspects, the compression-aware, widened BVH 800 may also be referred to as a widened BVH with leaf node compressibility prediction. In one illustrative example, the compression-aware, widened BVH 800 can be generated using a binary BVH as input (e.g., such as the binary BVH 600 illustrated in FIG. 6).

The compression-aware, widened BVH 800 is illustrated as an 8-wide BVH (e.g., each widened internal BVH node can include up to eight child nodes, and each compressed wide BVH leaf node can include up to four triangles or other scene primitives). In some examples, various other widened BVH sizes or dimensions may also be utilized (e.g., 4-wide, 16-wide, etc.).

The compression-aware, widened BVH 800 includes a wide BVH internal node 802 that stores bounding boxes or AABBs of the five internal nodes B1, B2, B3, B4, and B5 (e.g., 811-815, respectively). In some examples, the wide BVH internal node 802 can include a greater or lesser quantity of bounding boxes (e.g., AABBs) of internal nodes. For example, in some cases the wide BVH internal node 802 can store bounding boxes or AABBs for up to eight internal nodes.

The internal nodes stored in or associated with the wide BVH internal node 802 can collectively store, include, or contain bounding boxes (e.g., AABBs) for all thirteen of the triangles T1-T13 included in the binary BVH 600 illustrated in FIG. 6 (e.g., which can be provided as input to the presently disclosed systems and techniques for compression-aware BVH widening). The thirteen triangles T1-T13 can be included in a set of compressible wide BVH leaf nodes, such that the structure of the widened BVH 800 is unchanged between an uncompressed state and a compressed state. For example, because the set of wide BVH leaf nodes 850, 852, 854, 856, 858 are all compressible, no additional BVH internal nodes are generated during compression of the widened BVH and no new BVH leaf nodes are created during compression of the widened BVH.

In one illustrative example, the compressed wide BVH leaf node 850 includes compressed data associated with the three triangles T1, T2, and T4 and can be generated based on compressing a corresponding uncompressed wide BVH leaf node that includes the same three triangles T1, T2, T4. The compressed wide BVH leaf node 852 includes compressed data associated with the three triangles T3, T9, and T10 and can be generated based on compressing a corresponding uncompressed wide BVH leaf node that includes the same three triangles T3, T9, T10. The compressed wide BVH leaf node 854 includes compressed data associated with the two triangles T6 and T5 and can be generated based on compressing a corresponding uncompressed wide BVH leaf node that includes the same two triangles T6, T5. The compressed wide BVH leaf node 856 includes compressed data associated with the two triangles T12 and T13 and can be generated based on compressing a corresponding uncompressed wide BVH node that includes the same two triangles T12, T13. The compressed wide BVH leaf node 858 includes compressed data associated with the three triangles T7, T8, and T11 and can be generated based on compressing a corresponding uncompressed wide BVH node that includes the same three triangles T7, T8, T11.

In some aspects, an SAH associated with the compression-aware, widened BVH 800 may be greater than an SAH associated with the calculated optimal widened BVH 700a illustrated in FIG. 7A. However, because the calculated optimal widened BVH 700a of FIG. 7A includes the uncompressible widened BVH leaf nodes 724 and 728, applying compression to the calculated optimal widened BVH 700a of FIG. 7A results in the compressed and widened BVH 700b of FIG. 7B, which includes additional BVH internal nodes 704, 706 and new BVH leaf nodes 762, 764, 766, 768. In some aspects, an SAH associated with the compression-aware, widened BVH 800 can be smaller than an SAH associated with the compressed and widened BVH 700b that results from applying compression to a widened BVH that includes uncompressible leaf nodes. In some examples, the performance of ray tracing operations performed based on the compression-aware, widened BVH 800 can be improved (e.g., more efficient, more accelerated, etc.) than the performance of ray tracing operations performed based on the compression-naive, widened BVH 700b of FIG. 7B. In one illustrative example, the compressed wide BVH leaf nodes 850-858 can each include up to four compressed triangles or other scene primitives, although a maximum of three compressed triangles per compressed wide BVH leaf node is depicted in FIG. 8.

In one illustrative example, compressibility prediction can be performed based on analyzing or predicting a data redundancy between a set of triangles or other scene primitives received as input. For example, compressibility prediction can be performed based on analyzing or predicting a data redundancy between a set of triangles that are included in the same candidate widened BVH leaf node. In some aspects, the systems and techniques can perform compressibility prediction based on analyzing the vertices and/or coordinates of the input set of triangles. For example, each triangle can be associated with 3 vertices with each vertex having three values or components (e.g., x, y, and z; one value for each of the three dimensions associated with the 3D scene; etc.). For a set of four input triangles, a total of 36 values can be obtained or determined (e.g., 4 triangles*3 vertices*three coordinate values=36 total values).

In some aspects, compressibility prediction can be performed based on analyzing the coordinates of the vertices of the input set of triangles to identify one or more redundancies. For example, the compressibility prediction can determine a quantity or number of unique coordinate values in each axis or dimension in which the set of input triangles are defined. In one illustrative example, for an input set of four triangles, the compressibility prediction can determine the number of unique coordinates included in the four x-axis vertices (e.g., one x-axis vertex for each triangle), the number of unique coordinates included in the four y-axis vertices, and the number of unique coordinates included in the four z-axis vertices.

In some aspects, triangles included in a given scene object may share one or more edges (e.g., based on a scene object comprising a plurality of interlocking or meshed triangles that approximate a smooth surface). A pair of triangles that share an edge may share one or more coordinate values at one or more vertices. For example, two of the three vertices included in a pair of triangles that share an edge can be the same, in which case the pair of triangles may share six coordinate values (e.g., two shared vertices, each having three values x, y, z).

In one illustrative example, compressibility prediction can be performed based on determining a quantity or number of unique coordinates along each of the three axes in which the input set of triangles are defined. For example, out of 12 total coordinate values for each of the x, y, and z-axes, an input set of four triangles might be associated with a total of six unique coordinates in each of the three dimensions. In this scenario, the initial set of 4*3*3=36 total coordinate values can be reduced to a total of 3*6=18 unique coordinate values over the three dimensions. In some aspects, compressibility prediction can be performed based on this number of unique coordinate values associated with the set of input triangles (e.g., the set of triangles included in the same candidate widened BVH leaf node). For example, the systems and techniques can calculate, estimate, or predict a number of bytes needed to pack the total number of unique coordinates. If the number of bytes needed to pack or store the determined quantity of unique coordinates is less than a pre-determined maximum node size (e.g., 64 bytes), then the set of input triangles can be identified as compressible (e.g., and a candidate BVH leaf node that includes or stores the set of input triangles can be added to the widened BVH 800).

In some aspects, a compressibility prediction can be used to obtain an earlier result and/or earlier determination regarding the compressibility (or lack thereof) for a given candidate widened BVH leaf node than performing compression or otherwise explicitly determining (e.g., rather than predicting) the compressibility of the given candidate widened BVH leaf node. In some examples, an aggressiveness of the compressibility prediction can be varied. In one illustrative example, compressibility prediction can be performed for each iteration of candidate widened BVH tree configuration that is analyzed according to the systems and techniques described herein. For example, compressibility prediction can be performed for each candidate leaf node of each candidate widened BVH tree configuration, with a determination that any candidate widened BVH leaf node of a given candidate widened BVH tree configuration is uncompressible triggering the exclusion of the candidate widened BVH tree configuration.

Figure 9:
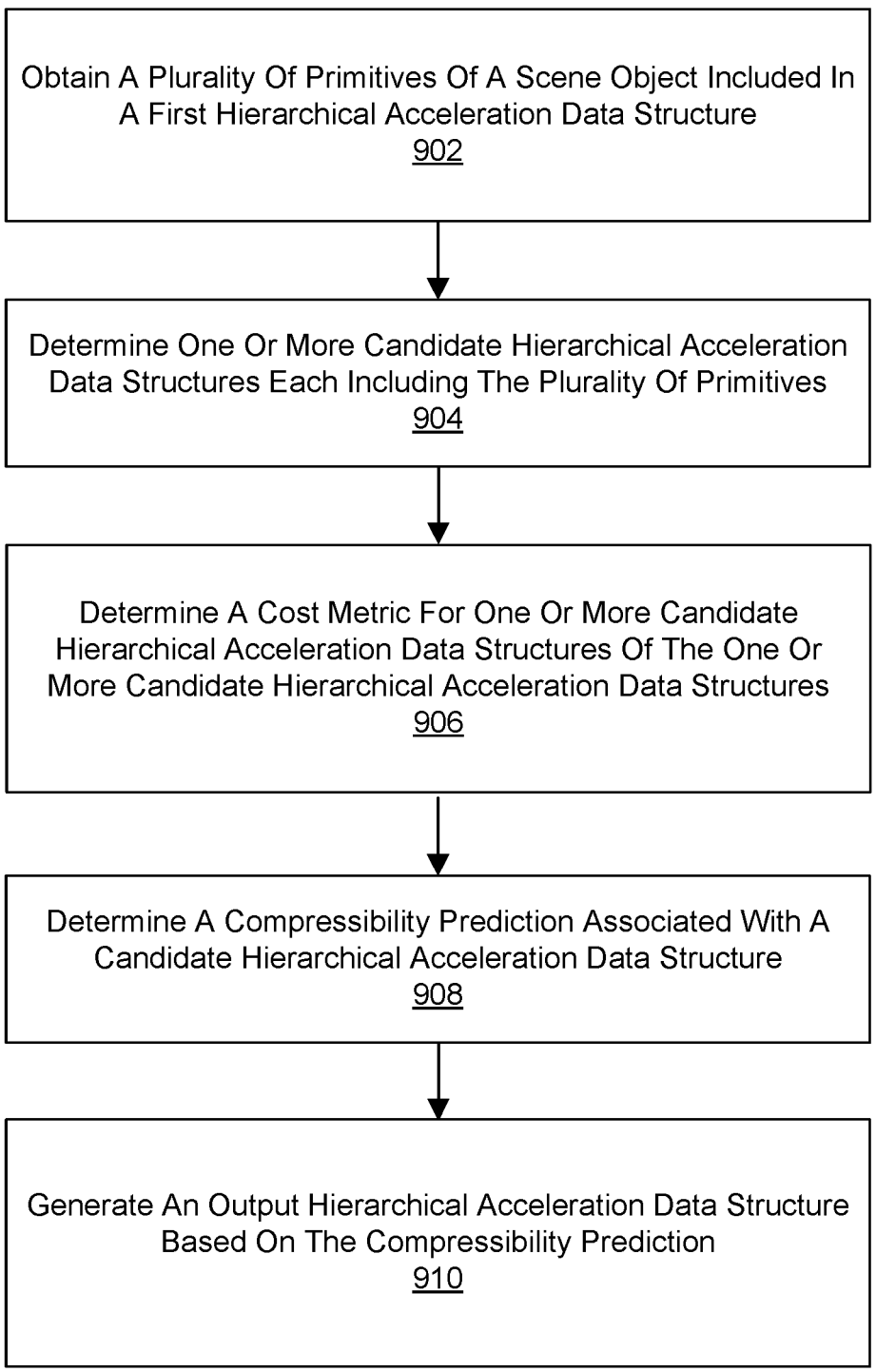
FIG. 9 is a flow diagram illustrating an example of a process for graphics processing, in accordance with some examples of the present disclosure.

FIG. 9 is a flowchart illustrating an example of a process 900 for graphics processing. Although the example process 900 depicts a particular sequence of operations, the sequence may be altered without departing from the scope of the present disclosure. For example, some of the operations depicted may be performed in parallel or in a different sequence that does not materially affect the function of the process 900. In other examples, different components of an example device or system that implements the process 900 may perform functions at substantially the same time or in a specific sequence.

At block 902, the process 900 includes obtaining a plurality of primitives of a scene object included in a first hierarchical acceleration data structure. For example, the plurality of primitives can include a plurality of triangles, axis-aligned bounding boxes (AABBs), and/or other scene geometry and/or scene primitives. In some cases, the first hierarchical acceleration data structure can be obtained by or from the acceleration data structure engine 522 associated with the ray tracing system 500 illustrated in FIG. 5. In some cases, the first hierarchical acceleration data structure can include a bounding volume hierarchy (BVH). In some examples, the first hierarchical acceleration data structure is a binary BVH.

In some cases, the plurality of primitives of the scene object can be included in one or more leaf nodes of the first hierarchical acceleration data structure. For example, the plurality of primitives can include the triangles T1-T11 included in the leaf nodes of the binary BVH 600 illustrated in FIG. 6. One or more internal nodes (e.g., BVH internal nodes) can include an axis-aligned bounding box (AABB) encompassing a subset of the one or more primitives of the scene object. For example, the one or more internal nodes can include an AABB encompassing a subset of the plurality of primitives included in the leaf nodes of the first hierarchical acceleration data structure.

At block 904, the process 900 includes determining one or more candidate hierarchical acceleration data structures each including the plurality of primitives. For example, the one or more candidate hierarchical acceleration data structures can be widened hierarchical acceleration data structures that each include the plurality of primitives. In some cases, a candidate hierarchical acceleration data structure can be generated based on widening the first hierarchical acceleration data structure. In some examples, a candidate hierarchical acceleration data structure can be generated based on widening a binary BVH that includes the plurality of primitives. For example, the one or more candidate hierarchical acceleration data structures can include (or otherwise be the same as or similar to) one or more of the widened BVHs 700a, 700b, and/or 800, illustrated in FIGS. 7A, 7B, and 8, respectively. In some cases, each widened hierarchical acceleration data structure can include the plurality of primitives in a set of leaf nodes.

At block 906, the process 900 includes determining a cost metric for one or more candidate hierarchical acceleration data structures of the one or more candidate hierarchical acceleration data structure. For example, the cost metric can be a Surface Area Heuristic (SAH). In some cases, the SAH can be determined for each leaf node included in a candidate hierarchical acceleration data structure and for each internal node included in the candidate hierarchical acceleration data structure. For example, the cost metric can be determined as a sum of the SAH for each leaf node and internal node included in a given candidate hierarchical acceleration data structure.

At block 908, the process 900 includes determining a compressibility prediction associated with a candidate hierarchical acceleration data structure of the one or more candidate hierarchical acceleration data structures. For example, the compressibility prediction can be determined based on predicting a quantity of bytes associated with compressing each leaf node include in the candidate hierarchical acceleration data structure. If the predicted quantity of bytes is less than (or equal to) a pre-determined threshold, the compressibility prediction can indicate that the candidate hierarchical acceleration data structure is compressible. If the predicted quantity of bytes is greater than a pre-determined threshold, the compressibility prediction can indicate that the candidate hierarchical acceleration data structure is not compressible.

In some examples, the pre-determined threshold is a maximum leaf node size. In some examples, the pre-determined threshold is 64 bytes.

At block 910, the process 900 includes generating an output hierarchical acceleration data structure based on the compressibility prediction. For example, the output hierarchical acceleration data structure can be the same as or similar to the example BVH 800 illustrated in FIG. 8. In some cases, generating the output hierarchical acceleration data structures comprises excluding the candidate hierarchical acceleration data structure based on determining, based on the compressibility prediction, that at least one leaf node included in the candidate hierarchical acceleration data structure cannot be compressed within a pre-determined maximum leaf node size. In some cases, generating the output hierarchical acceleration data structure comprises identifying the candidate hierarchical acceleration data structure having a best (e.g., lowest) cost metric (e.g., SAH) and a compressibility prediction indicating that the candidate hierarchical acceleration data structure is compressible within the pre-determined threshold quantity of bytes. For example, the output hierarchical acceleration data structure can be the candidate hierarchical acceleration data structure with the lowest SAH that can be compressed within the maximum leaf node size associated with the output hierarchical acceleration data structure (e.g., 64 bytes).

In some examples, the output hierarchical acceleration data structure is a widened BVH. In some cases, the process 900 can further include compressing one or more leaf nodes included in the widened BVH.

In some examples, the processes described herein (e.g., process 900 and/or any other process described herein) may be performed by a computing device, apparatus, or system. In one example, the process 900 can be performed by a computing device or system having the computing device architecture 1000 of FIG. 10. The computing device, apparatus, or system can include any suitable device, such as a mobile device (e.g., a mobile phone), a desktop computing device, a tablet computing device, a wearable device (e.g., a VR headset, an AR headset, AR glasses, an extended reality (XR) headset, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 900 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
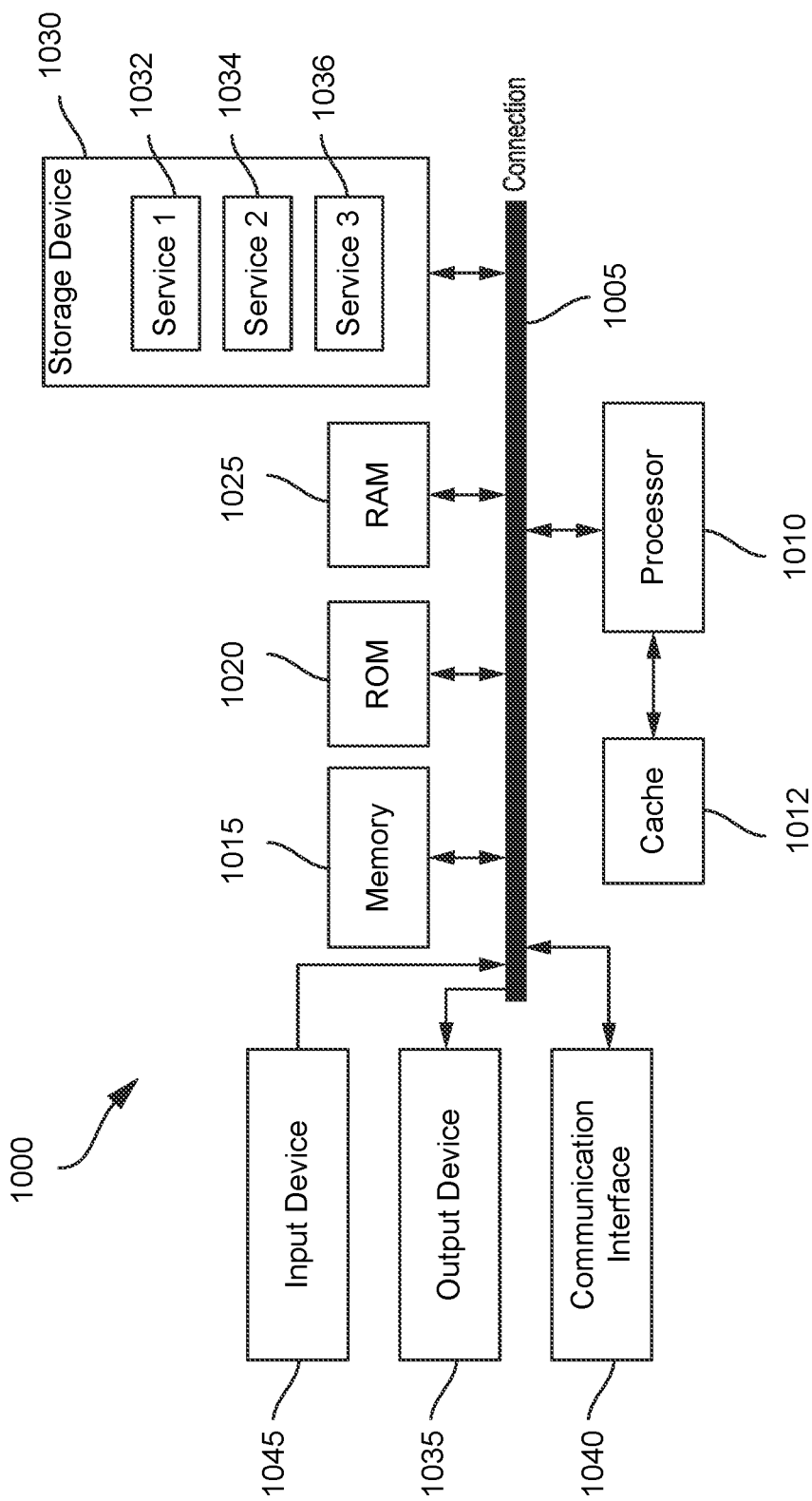
FIG. 10 is a block diagram illustrating an example of a computing system for implementing certain aspects described herein.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, an extended reality (XR) device, or a mixed reality (MR) device), a personal computer, a laptop computer, a video server, a vehicle (or computing device of a vehicle), or other device. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random-access memory (RAM) 1025, to processor 1010.

Computing device architecture 1000 can include a cache of high-speed memory connected directly with, in close proximity to, or integrated as part of processor 1010 Computing device architecture 1000 can copy data from memory 1015 and/or the storage device 1030 to cache 1012 for quick access by processor 1010. In this way, the cache can provide a performance boost that avoids processor 1010 delays while waiting for data. These and other engines can control or be configured to control processor 1010 to perform various actions. Other computing device memory 1015 may be available for use as well. Memory 1015 can include multiple different types of memory with different performance characteristics. Processor 1010 can include any general-purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules or engines are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("≤") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of ray tracing, the method comprising: obtaining a plurality of primitives of a scene object included in a first hierarchical acceleration data structure; determining one or more candidate hierarchical acceleration data structures, each candidate hierarchical acceleration data structure of the one or more candidate hierarchical acceleration data structures including the plurality of primitives; determining a cost metric for the one or more candidate hierarchical acceleration data structures; determining, based on the cost metric, a compressibility prediction associated with a candidate hierarchical acceleration data structure of the one or more candidate hierarchical acceleration data structures; and generating an output hierarchical acceleration data structure based on the compressibility prediction.

Aspect 2: The method of Aspect 1, wherein the first hierarchical acceleration data structure is a binary bounding volume hierarchy (BVH).

Aspect 3: The method of any of Aspects 1 to 2, wherein each candidate hierarchical acceleration data structure of the one or more candidate hierarchical acceleration data structures is a respective widened hierarchical acceleration data structure that includes the plurality of primitives.

Aspect 4: The method of Aspect 3, wherein each widened hierarchical acceleration data structure includes the plurality of primitives in a set of leaf nodes.

Aspect 5: The method of any of Aspects 1 to 4, wherein the cost metric is a Surface Area Heuristic (SAH).

Aspect 6: The method of Aspect 5, wherein the SAH is determined for each leaf node included in the candidate hierarchical acceleration data structure and each internal node included in the candidate hierarchical acceleration data structure.

Aspect 7: The method of any of Aspects 1 to 6, wherein determining the compressibility prediction associated with the candidate hierarchical acceleration data structure comprises: predicting a quantity of bytes associated with compressing each leaf node included in the candidate hierarchical acceleration data structure; and determining if a predicted quantity of bytes is less than a pre-determined threshold.

Aspect 8: The method of Aspect 7, wherein the pre-determined threshold is a maximum leaf node size.

Aspect 9: The method of any of Aspects 7 to 8, wherein the pre-determined threshold is 64 bytes.

Aspect 10: The method of any of Aspects 1 to 9, wherein generating the output hierarchical acceleration data structure comprises: excluding the candidate hierarchical acceleration data structure based on determining, based on the compressibility prediction, at least one leaf node included in the candidate hierarchical acceleration data structure cannot be compressed within a pre-determined maximum leaf node size.

Aspect 11: The method of any of Aspects 1 to 10, wherein the output hierarchical acceleration data structure is a widened bounding volume hierarchy (BVH).

Aspect 12: The method of Aspect 11, further comprising compressing one or more leaf nodes included in the widened BVH.

Aspect 13: An apparatus for ray tracing, comprising: a memory; and one or more processors coupled to the memory, the one or more processors configured to: obtain a plurality of primitives of a scene object included in a first hierarchical acceleration data structure; determine one or more candidate hierarchical acceleration data structures, each candidate hierarchical acceleration data structure of the one or more candidate hierarchical acceleration data structures including the plurality of primitives; determine a cost metric for the one or more candidate hierarchical acceleration data structures; determine, based on the cost metric, a compressibility prediction associated with a candidate hierarchical acceleration data structure of the one or more candidate hierarchical acceleration data structures; and generate an output hierarchical acceleration data structure based on the compressibility prediction.

Aspect 14: The apparatus of Aspect 13, wherein the first hierarchical acceleration data structure is a binary bounding volume hierarchy (BVH).

Aspect 15: The apparatus of any of Aspects 13 to 14, wherein each candidate hierarchical acceleration data structure of the one or more candidate hierarchical acceleration data structures is a respective widened hierarchical acceleration data structure that includes the plurality of primitives.

Aspect 16: The apparatus of Aspect 15, wherein each widened hierarchical acceleration data structure includes the plurality of primitives in a set of leaf nodes.

Aspect 17: The apparatus of any of Aspects 13 to 16, wherein the cost metric is a Surface Area Heuristic (SAH).

Aspect 18: The apparatus of Aspect 17, wherein the one or more processors are configured to determine the SAH for each leaf node included in the candidate hierarchical acceleration data structure and each internal node included in the candidate hierarchical acceleration data structure.

Aspect 19: The apparatus of any of Aspects 13 to 18, wherein to determine the compressibility prediction associated with the candidate hierarchical acceleration data structure, the one or more processors are configured to: predict a quantity of bytes associated with compressing each leaf node included in the candidate hierarchical acceleration data structure; and determine if a predicted quantity of bytes is less than a pre-determined threshold.

Aspect 20: The apparatus of Aspect 19, wherein the pre-determined threshold is a maximum leaf node size.

Aspect 21: The apparatus of any of Aspects 19 to 20, wherein the pre-determined threshold is 64 bytes.

Aspect 22: The apparatus of any of Aspects 13 to 21, wherein to generate the output hierarchical acceleration data structure, the one or more processors are configured to: exclude the candidate hierarchical acceleration data structure based on determining, based on the compressibility prediction, at least one leaf node included in the candidate hierarchical acceleration data structure cannot be compressed within a pre-determined maximum leaf node size.

Aspect 23: The apparatus of any of Aspects 13 to 22, wherein the output hierarchical acceleration data structure is a widened bounding volume hierarchy (BVH).

Aspect 24: The apparatus of Aspect 23, wherein the one or more processors are further configured to compress one or more leaf nodes included in the widened BVH.

Aspect 25: A non-transitory computer-readable medium having stored thereon instructions that, when executed by one or more processor, cause the one or more processors to: obtain a plurality of primitives of a scene object included in a first hierarchical acceleration data structure; determine one or more candidate hierarchical acceleration data structures, each candidate hierarchical acceleration data structure of the one or more candidate hierarchical acceleration data structures including the plurality of primitives; determine a cost metric for the one or more candidate hierarchical acceleration data structures; determine, based on the cost metric, a compressibility prediction associated with a candidate hierarchical acceleration data structure of the one or more candidate hierarchical acceleration data structures; and generate an output hierarchical acceleration data structure based on the compressibility prediction.

Aspect 26: The non-transitory computer-readable medium of Aspect 25, wherein the first hierarchical acceleration data structure is a binary bounding volume hierarchy (BVH).

Aspect 27: The non-transitory computer-readable medium of any of Aspects 25 to 26, wherein each candidate hierarchical acceleration data structure of the one or more candidate hierarchical acceleration data structures is a respective widened hierarchical acceleration data structure that includes the plurality of primitives in a set of leaf nodes.

Aspect 28: The non-transitory computer-readable medium of any of Aspects 25 to 27, wherein the cost metric is a Surface Area Heuristic (SAH) and the one or more processors are configured to determine the SAH for each leaf node included in the candidate hierarchical acceleration data structure and each internal node included in the candidate hierarchical acceleration data structure.

Aspect 29: The non-transitory computer-readable medium of any of Aspects 25 to 28, wherein to determine the compressibility prediction associated with the candidate hierarchical acceleration data structure, the one or more processors are configured to: predict a quantity of bytes associated with compressing each leaf node included in the candidate hierarchical acceleration data structure; and determine if a predicted quantity of bytes is less than a pre-determined threshold.

Aspect 30: The non-transitory computer-readable medium of Aspect 29, wherein the pre-determined threshold is a maximum leaf node size.

Aspect 31: An apparatus comprising means for performing any of the operations of Aspects 1 to 30.

Aspect 32: A non-transitory computer-readable storage medium having stored thereon instructions which, when executed by one or more processors, cause the one or more processors to perform any of the operations of Aspects 1 to 30.

What is claimed is:

1. A method of ray tracing, the method comprising:
obtaining a plurality of primitives of a scene object included in a first hierarchical acceleration data structure;
determining one or more candidate hierarchical acceleration data structures, each candidate hierarchical acceleration data structure of the one or more candidate hierarchical acceleration data structures including the plurality of primitives;
determining a cost metric for the one or more candidate hierarchical acceleration data structures;
determining, based on the cost metric, a compressibility prediction associated with a candidate hierarchical acceleration data structure of the one or more candidate hierarchical acceleration data structures; and
generating an output hierarchical acceleration data structure based on the compressibility prediction.

2. The method of claim 1, wherein the first hierarchical acceleration data structure is a binary bounding volume hierarchy (BVH).

3. The method of claim 1, wherein each candidate hierarchical acceleration data structure of the one or more candidate hierarchical acceleration data structures is a respective widened hierarchical acceleration data structure that includes the plurality of primitives.

4. The method of claim 3, wherein each widened hierarchical acceleration data structure includes the plurality of primitives in a set of leaf nodes.

5. The method of claim 1, wherein the cost metric is a Surface Area Heuristic (SAH).

6. The method of claim 5, wherein the SAH is determined for each leaf node included in the candidate hierarchical acceleration data structure and each internal node included in the candidate hierarchical acceleration data structure.

7. The method of claim 1, wherein determining the compressibility prediction associated with the candidate hierarchical acceleration data structure comprises:
predicting a quantity of bytes associated with compressing each leaf node included in the candidate hierarchical acceleration data structure; and
determining if a predicted quantity of bytes is less than a pre-determined threshold.

8. The method of claim 7, wherein the pre-determined threshold is a maximum leaf node size.

9. The method of claim 7, wherein the pre-determined threshold is 64 bytes.

10. The method of claim 1, wherein generating the output hierarchical acceleration data structure comprises:
excluding the candidate hierarchical acceleration data structure based on determining, based on the compressibility prediction, at least one leaf node included in the candidate hierarchical acceleration data structure cannot be compressed within a pre-determined maximum leaf node size.

11. The method of claim 1, wherein the output hierarchical acceleration data structure is a widened bounding volume hierarchy (BVH).

12. The method of claim 11, further comprising compressing one or more leaf nodes included in the widened BVH.

13. An apparatus for ray tracing, comprising:
a memory; and
one or more processors coupled to the memory, the one or more processors configured to:
obtain a plurality of primitives of a scene object included in a first hierarchical acceleration data structure;
determine one or more candidate hierarchical acceleration data structures, each candidate hierarchical acceleration data structure of the one or more candidate hierarchical acceleration data structures including the plurality of primitives;
determine a cost metric for the one or more candidate hierarchical acceleration data structures;
determine, based on the cost metric, a compressibility prediction associated with a candidate hierarchical acceleration data structure of the one or more candidate hierarchical acceleration data structures; and
generate an output hierarchical acceleration data structure based on the compressibility prediction.

14. The apparatus of claim 13, wherein the first hierarchical acceleration data structure is a binary bounding volume hierarchy (BVH).

15. The apparatus of claim 13, wherein each candidate hierarchical acceleration data structure of the one or more candidate hierarchical acceleration data structures is a respective widened hierarchical acceleration data structure that includes the plurality of primitives.

16. The apparatus of claim 15, wherein each widened hierarchical acceleration data structure includes the plurality of primitives in a set of leaf nodes.

17. The apparatus of claim 13, wherein the cost metric is a Surface Area Heuristic (SAH).

18. The apparatus of claim 17, wherein the one or more processors are configured to determine the SAH for each leaf node included in the candidate hierarchical acceleration data structure and each internal node included in the candidate hierarchical acceleration data structure.

19. The apparatus of claim 13, wherein to determine the compressibility prediction associated with the candidate hierarchical acceleration data structure, the one or more processors are configured to:
predict a quantity of bytes associated with compressing each leaf node included in the candidate hierarchical acceleration data structure; and
determine if a predicted quantity of bytes is less than a pre-determined threshold.

20. The apparatus of claim 19, wherein the pre-determined threshold is a maximum leaf node size.

21. The apparatus of claim 19, wherein the pre-determined threshold is 64 bytes.

22. The apparatus of claim 13, wherein to generate the output hierarchical acceleration data structure, the one or more processors are configured to:
exclude the candidate hierarchical acceleration data structure based on determining, based on the compressibility prediction, at least one leaf node included in the candidate hierarchical acceleration data structure cannot be compressed within a pre-determined maximum leaf node size.

23. The apparatus of claim 13, wherein the output hierarchical acceleration data structure is a widened bounding volume hierarchy (BVH).

24. The apparatus of claim 23, wherein the one or more processors are further configured to compress one or more leaf nodes included in the widened BVH.

25. A non-transitory computer-readable medium having stored thereon instructions that, when executed by one or more processor, cause the one or more processors to:
obtain a plurality of primitives of a scene object included in a first hierarchical acceleration data structure;
determine one or more candidate hierarchical acceleration data structures, each candidate hierarchical acceleration data structure of the one or more candidate hierarchical acceleration data structures including the plurality of primitives;
determine a cost metric for the one or more candidate hierarchical acceleration data structures;
determine, based on the cost metric, a compressibility prediction associated with a candidate hierarchical acceleration data structure of the one or more candidate hierarchical acceleration data structures; and
generate an output hierarchical acceleration data structure based on the compressibility prediction.

26. The non-transitory computer-readable medium of claim 25, wherein the first hierarchical acceleration data structure is a binary bounding volume hierarchy (BVH).

27. The non-transitory computer-readable medium of claim 25, wherein each candidate hierarchical acceleration data structure of the one or more candidate hierarchical acceleration data structures is a respective widened hierarchical acceleration data structure that includes the plurality of primitives in a set of leaf nodes.

28. The non-transitory computer-readable medium of claim 25, wherein the cost metric is a Surface Area Heuristic (SAH) and the one or more processors are configured to determine the SAH for each leaf node included in the candidate hierarchical acceleration data structure and each internal node included in the candidate hierarchical acceleration data structure.

29. The non-transitory computer-readable medium of claim 25, wherein to determine the compressibility prediction associated with the candidate hierarchical acceleration data structure, the one or more processors are configured to:
predict a quantity of bytes associated with compressing each leaf node included in the candidate hierarchical acceleration data structure; and
determine if a predicted quantity of bytes is less than a pre-determined threshold.

30. The non-transitory computer-readable medium of claim 29, wherein the pre-determined threshold is a maximum leaf node size.

* * * * *